(12) United States Patent
Hannebauer et al.

(10) Patent No.: US 11,838,047 B2
(45) Date of Patent: *Dec. 5, 2023

(54) SYSTEM FOR TRANSPORTING SAMPLED SIGNALS OVER IMPERFECT ELECTROMAGNETIC PATHWAYS

(71) Applicant: HYPHY USA INC., Wilmington, DE (US)

(72) Inventors: Rob Hannebauer, Vancouver (CA); Todd Rockoff, Holgate (AU); Dean Rubine, Lee, NH (US)

(73) Assignee: HYPHY USA INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/834,551

(22) Filed: Jun. 7, 2022

(65) Prior Publication Data

US 2022/0302953 A1    Sep. 22, 2022

Related U.S. Application Data

(63) Continuation of application No. 17/246,249, filed on Apr. 30, 2021, now Pat. No. 11,394,422, which is a
(Continued)

(30) Foreign Application Priority Data

Sep. 21, 2015   (AU) ................. 2015903845

(51) Int. Cl.
| | | |
|---|---|---|
| *H04B 1/707* | (2011.01) | |
| *H04N 7/10* | (2006.01) | |
| *H04J 13/10* | (2011.01) | |

(52) U.S. Cl.
CPC .............. *H04B 1/707* (2013.01); *H04J 13/10* (2013.01); *H04N 7/108* (2013.01)

(58) Field of Classification Search
CPC .......... H04B 1/707; H04J 13/10; H04N 7/108
(Continued)

(56) References Cited

U.S. PATENT DOCUMENTS 3,204,035 A   8/1965   Ballard et al.
3,795,765 A   3/1974   Degroat et al.
(Continued)

FOREIGN PATENT DOCUMENTS

CN   101116300 A   1/2008
CN   101933277     12/2010
(Continued)

OTHER PUBLICATIONS

International Search Report dated Dec. 12, 2016, from International Application No. PCT/AU2016/050880.
(Continued)

*Primary Examiner* — Siu M Lee
(74) *Attorney, Agent, or Firm* — Beyer Law Group LLP

(57) ABSTRACT

Infrastructure electronics equipment incorporates infrastructure Local-Site Transports (LSTs). LSTs convey payload sampled signals over imperfect electromagnetic (EM) pathways whose physical properties are usually unknown when the equipment (e.g., Cameras, Displays, Set-Top Boxes) is manufactured. Prior LSTs hedge against EM pathway degradation in several ways: requiring high-quality cables (e.g., HDMI); restricting transmission distance, (e.g., HDMI); and/or reducing quality, via compression, to extend transmission distance somewhat (e.g., Ethernet). The subject of this disclosure is an infrastructure LST for sampled signals that causes the physical errors inevitably arising from propagation of sensory payloads over imperfect EM pathways to manifest in a perceptually benign manner, leveraging legacy infrastructure and reducing costs to achieve a favorable ratio of fidelity to transmission distance.

32 Claims, 14 Drawing Sheets

Related U.S. Application Data continuation of application No. 16/777,014, filed on Jan. 30, 2020, now Pat. No. 11,025,292, which is a continuation of application No. 16/199,559, filed on Nov. 26, 2018, now Pat. No. 10,763,914, which is a continuation of application No. 15/925,123, filed on Mar. 19, 2018, now Pat. No. 10,158,396, which is a continuation of application No. PCT/AU2016/050880, filed on Sep. 21, 2016.

(58) Field of Classification Search
USPC ....... 375/130, 140, 141, 142, 143, 146, 147, 375/150, 152
See application file for complete search history.

(56) References Cited

U.S. PATENT DOCUMENTS

| | | | |
|---|---|---|---|
| 5,793,759 A | 8/1998 | Rakib et al. | |
| 5,796,774 A | 8/1998 | Kato | |
| 5,870,414 A | 2/1999 | Chaib et al. | |
| 5,936,997 A | 8/1999 | Kanda | |
| 5,938,787 A | 8/1999 | Stark et al. | |
| 5,956,333 A * | 9/1999 | Zhou ................. | H04B 1/71075 375/349 |
| 5,966,376 A | 10/1999 | Rakib et al. | |
| 6,018,547 A | 1/2000 | Arkhipkin | |
| 6,128,309 A | 10/2000 | Tariki et al. | |
| 6,310,923 B1 | 10/2001 | Lee et al. | |
| 6,480,559 B1 | 11/2002 | Dabak et al. | |
| 6,751,247 B1 | 6/2004 | Zhengdi | |
| 6,763,009 B1 | 7/2004 | Bedekar et al. | |
| 6,956,891 B2 | 10/2005 | Tan et al. | |
| 7,710,910 B2 | 5/2010 | Ode et al. | |
| 7,793,022 B2 | 9/2010 | Travers et al. | |
| 7,796,575 B2 * | 9/2010 | Lim ................... | H04L 27/2602 370/335 |
| 7,873,097 B1 * | 1/2011 | Luecke ................ | H04B 1/707 375/147 |
| 7,873,980 B2 | 1/2011 | Horan et al. | |
| 7,908,643 B2 | 3/2011 | Huotari et al. | |
| 7,937,605 B2 | 5/2011 | Rea et al. | |
| 7,996,584 B2 | 8/2011 | Keady et al. | |
| 8,073,647 B2 | 12/2011 | Horan et al. | |
| 8,094,700 B2 | 1/2012 | Okazaki | |
| 8,272,023 B2 | 9/2012 | Horan et al. | |
| 8,280,668 B2 | 10/2012 | Horan et al. | |
| 8,295,296 B2 | 10/2012 | Keady et al. | |
| 8,369,794 B1 | 2/2013 | Bharghavan et al. | |
| RE44,199 E | 5/2013 | Garodnick | |
| 8,520,776 B2 | 8/2013 | Rea et al. | |
| 8,546,688 B2 | 10/2013 | Horan et al. | |
| 8,674,223 B2 | 3/2014 | Horan et al. | |
| 8,674,224 B2 | 3/2014 | Horan et al. | |
| 8,674,225 B2 | 3/2014 | Horan et al. | |
| 8,674,226 B2 | 3/2014 | Horan et al. | |
| 8,680,395 B2 | 3/2014 | Horan et al. | |
| 8,705,588 B2 | 4/2014 | Odenwalder | |
| 9,324,478 B2 | 4/2016 | Horan et al. | |
| 9,970,768 B2 | 5/2018 | Monroe et al. | |
| 10,158,396 B2 * | 12/2018 | Hannebauer ............ | H04J 13/10 |
| 10,763,914 B2 | 9/2020 | Hannebauer et al. | |
| 11,025,292 B2 * | 6/2021 | Hannebauer ............ | H04J 13/10 |
| 11,394,422 B2 * | 7/2022 | Hannebauer ........... | H04B 1/707 |
| 11,716,114 B2 | 8/2023 | Hannebauer | |
| 2019/0260629 A | 8/1919 | Nikopour et al. | |
| 2021/0258039 A | 8/1921 | Hannebauer et al. | |
| 2002/0013926 A1 | 1/2002 | Kim et al. | |
| 2002/0097779 A1 | 7/2002 | Bang et al. | |
| 2002/0154620 A1 | 10/2002 | Azenkot et al. | |
| 2003/0139178 A1 | 7/2003 | Uesugi et al. | |
| 2004/0120415 A1 | 6/2004 | Song et al. | |
| 2005/0069020 A1 | 3/2005 | Lakkis | |
| 2008/0084920 A1 | 4/2008 | Okazaki | |
| 2008/0106306 A1 | 5/2008 | Keady et al. | |
| 2010/0013579 A1 | 1/2010 | Horan et al. | |
| 2010/0091990 A1 * | 4/2010 | Etemad ................ | H04J 14/005 398/79 |
| 2010/0142723 A1 | 6/2010 | Bucklen | |
| 2010/0321591 A1 | 12/2010 | Onomatsu | |
| 2011/0044409 A1 | 2/2011 | Yoshimoto et al. | |
| 2012/0014464 A1 | 1/2012 | Eiger et al. | |
| 2014/0218616 A1 * | 8/2014 | Toba .................. | H04N 21/4302 348/723 |
| 2016/0127087 A1 | 5/2016 | Feher | |
| 2019/0174027 A1 | 6/2019 | Lv et al. | |
| 2022/0368369 A1 * | 11/2022 | Hannebauer ............ | H04B 1/06 |
| 2023/0059143 A1 * | 2/2023 | Hannebauer .......... | H04J 13/004 |
| 2023/0223981 A1 * | 7/2023 | Hannebauer ........... | H04B 1/707 375/140 |
| 2023/0230559 A1 * | 7/2023 | Friedman ............... | G09G 5/008 345/204 |

FOREIGN PATENT DOCUMENTS

| | | |
|---|---|---|
| CN | 101969319 | 2/2011 |
| CN | 101917209 | 7/2015 |
| CN | 107251439 A | 10/2017 |
| EP | 1 079 536 | 2/2001 |
| EP | 0727881 A3 | 1/2002 |
| EP | 1 968 324 | 9/2008 |
| JP | 58-005065 | 1/1983 |
| JP | 08293818 | 11/1996 |
| JP | H09312590 | 12/1997 |
| JP | 2001-144653 | 5/2001 |
| JP | 2001156861 | 6/2001 |
| JP | 2001510658 | 7/2001 |
| JP | 2002281545 | 9/2002 |
| JP | 2007-150971 | 6/2007 |
| JP | 2011003331 | 6/2011 |
| WO | WO 97/02663 | 1/1997 |
| WO | WO 98/52365 | 11/1998 |
| WO | 2010/106330 | 9/2010 |
| WO | 2018-170546 | 9/2010 |
| WO | WO 2012/007785 | 1/2012 |

OTHER PUBLICATIONS

Eltokhy et al., "A Low Power Analog Matched-Filter with Smart Sliding Correlation", IEEJ Trans., EIS, vol. 123, No. 11, 2003, pp. 1970-1976.

Van der Heijden, "An Analog Correlator for a High-Speed DS-CDMA Modem", Eindhoven University of Technology, Department of Electrical Engineering Telecommunication Technology and Electromagnetis, 1998, 65 pages.

Chinese Office Action dated Jan. 6, 2020, from Chinese Application No. 201680046615.5.

Extended European Search Report dated May 14, 2019, from European Application No. 16847645.5.

Japanese Office Action for Patent Application No. 2019-548445, dated Mar. 25, 2022.

IEEE, An Analog Spread-Spectrum Interface for Power-Line Data Communication in Home Networking, dated Jan. 2005.

Hannebauer et al., U.S. Appl. No. 18/333,811, filed Jun. 13, 2023.

* cited by examiner

| | j → 916 | | | | | | L-8 | L-7 | L-6 | L-5 | L-4 | L-3 | L-2 | L-1 |
|---|---|---|---|---|---|---|---|---|---|---|---|---|---|---|
| i | 0 | 1 | 2 | 3 | | | | | | | | | | |
| 0 | 1 | -1 | -1 | -1 | | | -1 | -1 | -1 | -1 | -1 | -1 | -1 | -1 |
| 1 | -1 | 1 | -1 | -1 | | | -1 | -1 | -1 | -1 | -1 | -1 | -1 | -1 |
| 2 | -1 | -1 | 1 | -1 | | | -1 | -1 | -1 | -1 | -1 | -1 | -1 | -1 |
| 3 | -1 | -1 | -1 | 1 | | | -1 | -1 | -1 | -1 | -1 | -1 | -1 | -1 |
| | | | | | ● ● ● | | | | | | | | | |
| N-3 | -1 | -1 | -1 | -1 | | | -1 | -1 | 1 | -1 | -1 | -1 | -1 | -1 |
| N-2 | -1 | -1 | -1 | -1 | | | -1 | -1 | -1 | 1 | -1 | -1 | -1 | -1 |
| N-1 | -1 | -1 | -1 | -1 | | | -1 | -1 | -1 | -1 | 1 | -1 | -1 | -1 |

SYSTEM FOR TRANSPORTING SAMPLED SIGNALS OVER IMPERFECT ELECTROMAGNETIC PATHWAYS

CROSS-REFERENCE TO RELATED APPLICATIONS

This application is a continuation of U.S. application Ser. No. 17/246,249, filed on Apr. 30, 2021, which is a continuation of U.S. application Ser. No. 16/777,014, filed on Jan. 30, 2020 (now U.S. Pat. No. 11,025,292, issued Jun. 1, 2021), which is a continuation of U.S. application Ser. No. 16/199,559, filed Nov. 26, 2018 (now U.S. Pat. No. 10,763,914, issued Sep. 1, 2020), which is a continuation of U.S. application Ser. No. 15/925,123, filed on Mar. 19, 2018 (now U.S. Pat. No. 10,158,396, issued Dec. 18, 2018), which is a continuation of International Application No. PCT/AU2016/050880, filed on Sep. 21, 2016, which claims priority to Australian patent application No. 2015903845, filed on Sep. 21, 2015, all of which are incorporated herein by reference in their entirety.

FIELD: INFRASTRUCTURE LOCAL-SITE TRANSPORT (LST)

The field of the disclosure is infrastructure local-site transport (LST) for conveying sampled signals between equipment pairs connected by EM pathways provided within constructed environments, such as within a room or within a vehicle or throughout a building or across a campus.

BACKGROUND

Video Systems

A video system includes Displays, Sensors, Signal Processors, Image/Video Stores, and Control Interfaces, as well as in some cases an Internet connection. The subject of this disclosure is local-site transport (LST), which locally interconnects video system equipment. Video equipment serves local environments. LST operating within environments occupied by people is distinguished from telecommunications, which interconnects remotely located equipment. Internet servers provide the content and manage the interactive experiences which are presented to consumers via video systems in any location connected to the Internet. That is why video systems are an intrinsic aspect of every delivery system for pixel-rich information.

Infrastructure Video Systems versus Mobile Video Systems

There are two kinds of video systems: Mobile and Infrastructure. These two types of system differ from one another in two ways: 1) Mobile systems are monolithic, whereas Infrastructure systems are assembled by customers or their agents from disparately manufactured equipment, and 2) Mobile systems draw power from batteries, whereas Infrastructure systems draw power from mains electricity. To summarize:

Mobile video systems draw power from batteries and are typically monolithic, each assembled by a single manufacturer from various components. For example, a smart phone implements a video processor, which reads multiple cameras and drives a palm-size screen, all packed within one enclosure.

Infrastructure video systems are powered by mains electricity and are assembled by customers from equipment that is produced by various manufacturers.

Both kinds of video systems are important for creating and accessing Internet content. Nevertheless, these two kinds of video systems present starkly different engineering challenges.

Mobile video systems are more readily integrated into a person's everyday life than Infrastructure video systems, due to portability.

Infrastructure video systems generate experiences that are more immersive than their Mobile counterparts because of the ability of immersive Virtual Reality (iVR™) to surround us with Displays and Sensors while drawing potentially large amounts of electrical power for arbitrarily long durations.

Example applications of Mobile video systems include
Collecting/posting Social Media material
Augmented Reality (AR) games, such as Pokémon GO
Virtual Reality (VR) systems wherein displays and/or cameras are tethered to a portable Media Processing Unit (MPU), which might itself be a smart phone or another portable device Example applications of Infrastructure video systems include
Video surveillance
Machine vision
Motor vehicle safety (sometimes related to machine vision)
Retail signage
Shopper behavior analysis (sometimes related to machine vision)
Motor vehicle driver and passenger navigation, control, and entertainment
Home Entertainment
immersive Virtual Reality ("iVR"), wherein cameras monitor the subject and displays surround the subject, such that the video system captures and presents pixel information from all angles Examples of Infrastructure video equipment include desktop (or tower) PCs, PC monitors, set-top boxes, TVs, video surveillance cameras, video surveillance recorders, video surveillance monitors, vehicle navigation and safety cameras, vehicle electrical control units (ECUs), automotive control & navigation displays, automotive entertainment cameras, automotive entertainment displays, retail and kiosk displays, iVR cameras, and iVR displays. The Infrastructure video equipment market sector is large and growing fast.

By contrast, there is no Mobile video equipment market. All of the components within a Mobile video system (the Internet Interface, digital Processor, Camera(s), and Display(s)) operate in close proximity, such that the entire system can be worn or carried. The interconnections operate over short ranges under well-controlled conditions, and all of the components are supplied as a monolithic entity, such that the customer has no choices to make.

Infrastructure video systems, by contrast, place great demands on video interconnections. Infrastructure video equipment is mounted at arbitrary locations within a building or campus, and the video is carried over a diversity of physical pathways including metal cables, radio, and/or optical fibre between independently manufactured equipment.

Video Local-Site Transports (LSTs)

This disclosure addresses one aspect of Infrastructure video system implementation: Local-Site Transport (LST). An LST conveys a video signal over an electromagnetic (EM) propagation pathway from a sending piece of equipment to a receiving piece of equipment located as far as hundreds of metres away from the sending equipment.

Three examples of electromagnetic (EM) pathways include electricity over wires, radiation through the air, and photons through a fibre. LSTs represent the transported video as EM energy in a form appropriate to the medium, for example voltage, radio waves, or light.

Types of Signal

For the purposes of this disclosure, a signal is a variable, conveyed as EM energy whose amplitude changes over time.

Two attributes characterize every signal:

Time
  Continuous: The time between values is limited by the resolution at which it is possible to measure time
  Discrete ("Sampled"): The time between values is predetermined, and its inverse is the sampled signal's "sampling rate"

Amplitude
  Continuous: The number of possible values is limited by the resolution at which it is possible to measure energy
  Discrete ("Quantized"): The number of possible values is predetermined, and its logarithm base 2 is the quantized signal's "number of bits"

There are four combinations of these attributes and thus four distinct types of signal:
  "Analog" signals are continuous-time, continuous-amplitude signals.
  "Digital" signals are discrete-time, discrete-amplitude signals.
  "Pulsatile" signals are discrete-time, continuous-amplitude signals. There is an appropriation of this unusual meaning of the term "pulsatile" for clarity in this disclosure. Pulsatile signals are commonly processed with "sampled analog" circuits, while others also skilled in the art might prefer the term "sample-and-hold" circuits.
  "Neuronal" signals are continuous-time, discrete-amplitude signals. This is not necessarily the usual meaning of the word "neuronal," but is fitting for this fourth quadrant of the taxonomy. Neuronal signals are outside the scope of the present disclosure.

This disclosure introduces local-site transport (LST) methods and apparatuses for sampled payload signals. Each payload signal is an ordered series of samples. The payload signals are processed in successive "snippets," where a snippet is a contiguous sub-series from the ordered series of samples comprising the signal. The methods and apparatuses disclosed herein are suitable for pulsatile signals and for digital signals. Band-limited analog signals may be sampled, such that they are also amenable to transport by the LSTs disclosed herein.

Video Signals

Video signals are used as examples of sampled payload signals for specificity where appropriate herein. There are many alternative, equally useful electronic formats for video signals. In any case, while images are two-dimensional objects, no matter what the color space of the electronic format and the resolution of each frame and the frame rate, every video signal is ultimately represented as a one-dimensional list of color values, i.e., an ordered series of input values. These input values are quantized for digital video and they are continuous values for pulsatile video.

Infrastructure Video LSTs

Mobile video systems are monolithic and compact, so LSTs are not a central focus of Mobile video equipment design. By contrast, LSTs are a critical design consideration for Infrastructure video systems, because Infrastructure video systems are assembled by end customers from equipment possibly made at various factories, and interconnected by difficult-to-predict and sometimes difficult-to-constrain infrastructure EM pathways.

An Infrastructure video LST conveys a video signal over an imperfect medium from the output terminal of a video sender, such as a camera or PlayStation, over an imperfect EM pathway to the input terminal of a video receiver, such as a display or Xbox. The sender and receiver may be implemented within a common enclosure, such as an all-in-one DVR with built-in display, or the two may be nearby, such as an HDMI display and a set-top box, or the two pieces of equipment may be located at different corners of a room, between fender and dash in a car, at opposite ends of a building, between buildings on a campus, or in different carriages along a train. LSTs for common media conveying electrical, RF, or optical signals represent the transported video as current/voltage, radio, or light, respectively.

An LST that can re-use legacy infrastructure cabling would be especially desirable, because cable installation is expensive, so reusing legacy infrastructure reduces installation costs. Such an LST is the subject of the present disclosure.

The following infrastructure LSTs are examples requiring a special kind of cable and connector:
  EIA/CEA-861 (HDMI) is the LST for home entertainment. A set-top box sends video over HDMI cable to a Display.
  USB Video Class is the LST for webcams. A webcam streams video over USB cable to a personal computer.
  Ethernet is the LST for IP cameras. An IP camera streams video over Unshielded Twisted Pair (UTP) cable to a LAN switch.

The following infrastructure LSTs are examples that do not require a special kind of cable and connector:
  NTSC/PAL is the LST for legacy CCTV systems. CCTV cameras stream video over RG-59 coaxial cable to DVRs.
  A wide range of HD CCTV LSTs is now available, including HD-SDI and several proprietary analogue HD solutions.
  A variety of LSTs is used for Virtual Reality (VR) systems that capture a person's appearances and gestures while contemporaneously presenting panoramic video.

Infrastructure video systems present a broad diversity of cabling challenges. In some infrastructure video applications such as CCTV, the EM pathway characteristics are not known when the individual equipment is manufactured. Some LSTs are therefore designed to tolerate a broad diversity of coaxial, UTP, and other cables.

DVI, LVDS, and HDBaseT are among the many HD video LSTs.

LSTs may be characterized by the specific set of limitations and trade-offs imposed. Unfortunately, the impacts of these limitations and trade-offs tend to increase as the number of infrastructure video equipment units and the resolution per video signal continue to increase in response to insatiable market demand.

SSDS-CDMA

In the search for an alternative LST, Spread Spectrum Direct Sequence—Code Division Multiple Access (SSDS-CDMA) transmission systems as defined in "Spread Spectrum Systems with Commercial Applications" by Robert C. Dixon, volume 3, Wiley & Sons 1994, is incorporated by reference into this specification.

SSDS is a signal transmission method in which each bit of the input signal is modulated by a higher-frequency Code in the transmitter, while the receiver correlates each sample of the received signal by a synchronized instance of the same Code.

SSDS is well known to confer multiple benefits, including resilience against EM propagation pathway defects, including for example roll-off, dispersion, reflections, and aggressor signals.

SSDS accounts for reflected waves from impedance discontinuities: the characteristic delay of these reflected waves is very much longer than a chip length. The only danger from reflections is locking on the reflected signal and not the main higher-intensity signal.

SSDS-CDMA is a transmission method combining several independent SSDS transmissions, through varying the Codes. The SSDS-CDMA receiver distinguishes among the various transmitters based on the Code used by each transmitter.

This disclosure addresses encoder assemblies and decoder assemblies adapted for use with arbitrarily impaired EM pathways.

An LST ideally delivers fit-for-purpose video. For human viewing applications of video systems, a fit-for-purpose LST delivers as faithful as possible a rendition of the payload video signal, while introducing a minimum of visually disturbing artifacts. The use of legacy cabling is always the least-cost cabling method, all else being equal, and fit-for-purpose LST can re-use legacy cabling, rather than requiring new or special cabling, and can utilize the full bandwidth and dynamic range of the cabling or other EM pathways in order to convey the essence of the video signals usefully over inexpensive cables.

In addition to the electrical ravages of roll-off, dispersion, reflections, and aggressor signals, factors such as incorrect termination, crimping under force, gnawing by rodents, and immersion in water mean that there are likely to be propagation errors over infrastructure cabling. Prior LSTs cause imperfections from EM pathway propagation to manifest as perceptually disturbing artifacts that can materially degrade the perceived value of sensory payloads. In order to mitigate the impacts on signal fidelity, these LSTs impose cable-length restrictions along with costly compression and filtering circuits, all of which constrain system implementations, while simultaneously limiting fidelity.

SUMMARY OF THE PRESENT DISCLOSURE

This specification discloses in one aspect an LST for sampled signals that causes EM propagation errors to manifest perceptually benignly in reconstructed payload signals, thereby providing best-one-might-do transport of sensory signals over imperfect EM pathways for human perceptual purposes.

Not all aspects of a sensory signal—for example, visual, auditory, pressure, haptic, chemical, etc.—are equally useful/valuable in the human brain's perception of the content of the signal, with respect to any given purpose. For example, a certain level of noise (a low pSNR) may render a video signal absolutely un-viewable and ineffective. On the other hand, people are readily able to discern important representative forms—ponies, puppies, other people, etc.— through considerable amounts of "snow," even despite extremely low pSNR.

In particular, each of the human perceptual subsystems is very much attuned to abrupt changes in sensory signals. For example, visual systems have evolved to be sensitive to high-temporal-frequency and high-spatial-frequency light patterns—some speculate so as to make for more effective hunters. Some high-frequency sensory inputs make us uncomfortable. At the other end of the spectrum, humans also tend to be troubled by an absolute nullity of sensory stimulation. It may be that people's senses prefer low-spatial-frequency and low-temporal-frequency inputs both to the high-frequency alternatives, and also to no signal at all. For example, some people rely on artificial audio white noise in order to go to sleep. In an aspect, the present disclosure contemplates enabling iVR™ (immersive Virtual Reality) systems that present electrical errors as visual white noise in ways that people find helpful or soothing.

Prior digital LSTs introduce a variety of high-temporal-frequency and high-spatial-frequency artifacts, which are disturbing to the eye. As a result, in addition to the computational effort expended in reducing the bit rate required to represent the payload, by algorithmically removing information (compression), these digital LSTs impose a further addition of costly corrections to the artifacts introduced by the digital LSTs in the first place. Examples of objectionable high-spatial-frequency artifacts include "contouring" edges appearing in gradual gradients presented over large digital display areas, and "blocking" artifacts arising from very minor errors on the order of 0.1% in the DC terms of DCT blocks in motion-based compression algorithms In an aspect of the disclosure, the methods and apparatuses disclosed herein cause EM pathway impairments to manifest as white noise in the reconstructed payload signals. The brain's ability to, for example, "see through" visual white noise or "hear through" auditory white noise or "feel through" rough patches in some surfaces, causes the differences in the reconstructed payload dimensions to be of the least value/significance for perception, with respect to the intended use of the sensory signals.

No EM pathway conveys information perfectly from one place to another. The subject of the present disclosure introduces an LST that provides a method for conveying sensory signals via inherently flawed EM propagation mediums. For human viewing purposes, the claimed LST allows transmitter equipment to transmit a representative signal to matching receiver equipment, under a broad diversity of information propagation conditions, that is reconstructed by the receiver into a viewable result.

The subject of the present disclosure includes in one aspect the encoder assembly and decoder assembly for sampled payloads, wherein the sample amplitudes may be represented either continuously (as pulsatile signals) or discretely (as digital signals). The method repeatedly constructs input vectors from payload snippets, encodes input vectors as ordered series of values to be made available, transports a signal by simultaneously transmitting and receiving, decoding the ordered series of values received from the EM pathway into output vectors, and distributing the output vectors as reconstructed payload snippets.

In one aspect, a method for collecting samples from input payload snippets into an input vector, encoding the input vector into an ordered series of output values to be made available, and making available the output values for transmission through an imperfect medium comprises a series of steps.

The first step of the method is collecting samples from the one or more input payload snippets into an indexed input vector of one predetermined length N. The predetermination of N involves a trade-off: Higher N confers greater throughput while sacrificing electrical resilience, all else being equal. In an embodiment, N=32. This collecting step takes place during a predetermined collecting interval, which might be different from the intervals during which the other steps of the method take place, those other intervals comprising the encoding interval, the transporting interval, the decoding interval, and the distributing interval. In a preferred embodiment, all intervals are of common duration.

This collecting step implements a predetermined permutation, which is a one-to-one mapping between indices in the set of input payload snippets to indices in the input vector. The properties of the permutation do not matter, such that any of the N! possible permutations is equally preferred. In an embodiment, the input payload snippet samples are assigned to input vector locations in straightforward round-robin order.

A further step in the method associates with each input vector index a unique code, wherein each of the codes in the set is itself an indexed sequence of values, and wherein each of the codes is different from the other N−1 codes in the set, and wherein the lengths of the codes are all equal to another predetermined length L. The predetermination of L involves a trade-off: Higher L confers greater electrical resilience at the expense of higher-speed circuit implementations. In an embodiment, L=128.

The next step of the method is the encoding step. The encoding step iterates the encoding inner loop L times, all within a predetermined encoding interval. There are L chip intervals for every encoding interval, such that the duration of the chip interval=encoding interval/L. The predetermination of the encoding interval is unconstrained. In a preferred embodiment, the encoding interval equals the transport interval.

The encoding step inner loop, executed once for each of the L indices in the codes, comprises two sub-steps:
  i. modulating each sample in the input vector by the value addressed by the loop index in the corresponding code, and
  ii. summing the results of all modulations of the prior sub-step to form one of the ordered series of output values, and wherein the ordered series of values resulting from the final step, one value for each code index and, equivalently, for each value of the loop index, in its entirety represents the input vector.

The final step is the making available step. The making available step inner loop, executed once for each of the L indices in the ordered series of output values, comprises one sub-step:
  i. making available the indexed one of the ordered series of output values to an imperfect EM pathway.

The making available step takes place within the predetermined transport interval, such that the duration of each inner loop iteration is equal to the duration of the transport interval divided by L. The predetermination of the transport interval depends, for example, upon trade-offs involving N, L, the energy density limits of the EM pathway, and the limits of the implementation technology: For fixed N and L, a shorter transport interval means higher payload throughput, at the expense of higher-speed embodiments, all else being equal. In an embodiment, the transport interval is 100 ns, corresponding to 10 million input vectors transported per second.

A preliminary step is to select values for N and L, each an integer ≥2. High L means high electrical resilience, but higher L demands higher-speed circuits. High N means high payload throughput, but higher N means lower resilience, for fixed L. In an embodiment, N=128 and L=1024.

Another preliminary step is to select a set ("book") of N Codes, one for each index in the encoder input vector. A Code is a unique indexed sequence of L values. In a preferred embodiment, each of these Chips is a binary value, either +1 or −1, and each Code is DC-balanced. Each Code in the Code book is associated with a unique position in the input vector. The first step in the method is to modulate the sample at each index in the vector by the correspondingly indexed value of the Code associated with that input vector index. Note that modulation can be accomplished especially cost-effectively when the Chip is restricted to +1/−1 or +1/0.

The next step in the method is to sum the results of each modulation of the first step to form a value for transmission. An ordered series of these values is conveyed during the transport interval to represent the input vector contents.

In a further aspect, each of the successive values produced by the encoding method is transmitted over an Imperfect Medium using a physical mechanism.

In a further aspect, if the output value is made available for transmission in digital form, then the method further includes a digital to physical analog conversion of the value prior to transmission into the EM pathway.

Note that these operations may be implemented either by digital circuits or by analog circuits or by a combination thereof. In any case, the physical transfer is electromagnetic propagation.

In an aspect, a method for receiving an ordered series of input values corresponding to a series of output values produced by a corresponding encoding method having been applied to one or more input payload snippets from an imperfect medium during a predetermined transport interval, decoding the ordered series of input values into an output vector, and distributing the output vector into one or more reconstructed payload snippets, comprises a series of steps.

The first step is to acquire synchronization with the signal arriving from the imperfect medium. The literature on SSDS-CDMA systems contains many methods and apparatus to acquire synchronization.

The next step is to prepare an output vector containing a predetermined number N of locations in which to develop the reconstructed samples.

The next step is to associate with each index in an output vector a code, from a predetermined code set, wherein each of the codes is an indexed sequence of values, or "chips." Each code is different from each of the other N-1 codes in the set. Also, each code is L chips long. Moreover, the code set is identical to the code set applied in the corresponding encoding method. L and N for the decoding method match the corresponding parameter values in the corresponding encoding method.

The next step is the receiving step. The receiving step takes place during the same transport interval in which the corresponding encoding method executes its making available step. The receiving step repeats an inner loop, executed once for each of the L indices in the ordered series of input values, comprising one sub-step:
  i. receiving the indexed one of the ordered series of output values from an imperfect EM pathway.

The duration of each loop iteration is given by transport interval divided by L. The ordered series of input values produced by the receiving step in its entirety represents the input payload snippets that were encoded by the corresponding encoding method and are to be reconstructed by this method.

The next step is the decoding step. The decoding step takes place during a predetermined decoding interval. In a preferred embodiment, the decoding interval equals the transport interval. The decoding step executes L iterations of the following loop, one iteration for each of the L indices in the ordered input series:

i. modulating the indexed value in the ordered input series by the commonly indexed value in the code corresponding to the output vector index,
ii. summing the modulation result from sub-step i) 1) with the correspondingly indexed element of the output vector,
iii. storing the summing result from sub-step i) 2) in the corresponding output vector index, and
iv. tracking synchronization with the sending signal.

The final step is the distributing step. The distributing step takes place during a predetermined distributing interval. In a preferred embodiment, the distributing interval equals the transport interval. This distributing step implements a pre-determined permutation, which is a one-to-one mapping between indices in the output vector to indices in the set of reconstructed payload snippets. The permutation is the inverse of the permutation applied in the corresponding encoding method. This decoder permutation presents zero or more samples from the output vector to each reconstructed payload snippet.

In an aspect, an apparatus for constructing an input vector of samples from one or more input payload snippets, encoding the input vector into an ordered series of output values, and transmitting the ordered series of output values into an imperfect medium during a pre-determined transport interval, comprises a collection of elements.

One of the elements is a memory for receiving and storing all of the samples in an input vector of a predetermined length N. The predetermination of N involves a trade-off: Higher N confers greater throughput while sacrificing electrical resilience, all else being equal. In an embodiment, N=16.

Another element is a permuter. The permuter assigns input payload snippet samples to input vector locations. The permuter implements a pre-determined permutation, which is also called a "one-to-one mapping." There are N! possible such permutations. In a preferred embodiment, the permutation is chosen for convenience.

Another element is a controller for repeating, for all N indices of the input vector during a predetermined collecting interval, the step of:
Configuring the permuter to store the successive input payload snippet sample to the indexed input vector location.

Another element is a set of N code generators for generating a predetermined set of codes. There is one code generator for each input vector index. Each code in the code set is an indexed sequence of values, or "chips." The codes are all a common predetermined length L, such that there are L chips in each code. The predetermination of L involves a trade-off: Higher L confers greater electrical resilience, at the expense of higher-speed circuit implementations. In an embodiment, L=1024. Each code is different from all the other codes in the set.

Another element is a set of N modulators. There is one modulator corresponding to each input vector index. Equivalently, there is one modulator corresponding to each code in the code set. Each modulator has two inputs: One input is the corresponding input sample, while the other input is the corresponding chip.

Another element is a single N-input summer. The summer inputs are driven by the modulator outputs, one per input vector index.

Another element is a controller for repeating, for all indices of the set of codes, at a rate sufficient to enumerate all indices of the set of codes within the predetermined encoding interval, the following steps:

modulating each element of the input vector with its corresponding modulator by the value stored in the commonly indexed position in the corresponding code, and
summing with the summer the results of all modulations of step g) i) to form the indexed one in the ordered series of output values.

In a preferred embodiment, the encoding interval equals the transport interval, such that each modulator can be seen directly to modulate its input sample by the corresponding code over the course of one encoding interval.

Another element is an output terminal for making available the ordered series of values created during the encoding interval.

Another element is a controller for repeating during the transport interval, for each of the L indices in the ordered series of output values, wherein the duration of each step is equal to the duration of the transport interval divided by L, the step of:
making available the indexed value in the ordered output series created during the encoding interval at a rate sufficient to enumerate all of the series indices within the transport interval.

The ordered output series that has been made available after L iterations of the foregoing making available step in its entirety represents the input payload snippets.

In a further aspect, the values are transmitted over an imperfect EM propagation pathway.

In a further aspect, the encoder assembly apparatus varies these parameters under algorithmic control, for example to accommodate changes in the nature of the payload, the EM pathway propagation characteristics, or the application requirements.

In an aspect, an apparatus for receiving an ordered series of input values corresponding to an ordered series of output values produced by a corresponding encoding apparatus having been applied to one or more input payload snippets from an imperfect medium during a predetermined transport interval, decoding the ordered series of input values into an output vector of samples, and distributing the output vector as one or more reconstructed payload snippets, comprises a collection of elements.

One of the elements is a memory for reconstructing and storing all of the samples in an output vector of a predetermined length N, which equals the N of the corresponding encoding apparatus.

One of the elements is a set of code generators. There are N code generators, one for each output vector index. Each code generator produces a predetermined code, which is an indexed sequence of values, or "chips." Each code in the code set is another predetermined length L, which equals the L of the corresponding encoding apparatus. Each code is different from all the other codes in the set. The code set is identical to the code set of the corresponding encoding apparatus.

Another of elements is a set of N correlators. There is one correlator corresponding to each output vector index and, equivalently, one correlator corresponding to each code in the code set. Each correlator has two inputs: One input is the received input value, and the other input is the corresponding chip.

One of the elements is a set of N summing circuits. There is one summing circuit associated with each output vector index. Each summing circuit has two inputs: One input is the output of the corresponding correlator, and the other is the content of the correspondingly indexed output vector location.

One of the elements is a synchronization acquisition and tracking circuit. The synchronization and acquisition circuit comprises a clock recovery circuit and a correlation spike detector.

One of the elements is a controller for repeating during the transport interval, for each of the L indices in the ordered series of input values, the steps of:
  i. configuring the synchronization acquisition and tracking circuit to infer reference clock frequency and phase by analyzing the signal arriving from the imperfect medium, and
  ii. receiving the indexed value in the ordered input series at a rate sufficient to enumerate all of the series indices within the transport interval.

The ordered input series that has been received after L iterations of the foregoing receiving loop has completed in its entirety represents the payload snippets to be reconstructed.

The duration of each step in the receiving loop is equal to the duration of the transport interval divided by L.

Another of the elements is a controller for repeating, during a predetermined decoding interval, for each of the L indices in the ordered series of input values, the step of:
  repeating, for each of the N indices in the output vector, the sub-steps of:
    i. configuring the indexed correlator to contribute a portion of the indexed output sample by correlating the received input value by the commonly indexed value in the indexed code,
    ii. configuring the indexed summing circuit to sum the output of the indexed correlator with the content of the indexed output vector location, and
    iii. configuring the correspondingly indexed location in the output vector memory to receive the output of the summing circuit.

One of the elements is a controller for repeating, during a predetermined distributing interval, for each of the N indices in the output vector, the steps of:
  i. configuring the synchronization acquisition and tracking circuit to infer reference clock frequency and phase by analyzing the signal arriving from the imperfect medium, and
  ii. receiving the indexed value in the ordered input series at a rate sufficient to enumerate all of the series indices within the transport interval.

The ordered input series that has been received after completion of L iterations of the inner loop above in its entirety represents the payload snippets to be reconstructed.

One of the elements is a controller for repeating during a predetermined distributing interval, for all N indices of the output vector, the step of:
  i. configuring the permuter to make available the indexed output vector location as the successive reconstructed payload snippet sample.

In a further aspect, the ordered series of input values is received over an imperfect electromagnetic propagation pathway.

In another aspect, what is claimed is an LST incorporating an encoder assembly apparatus paired with a corresponding decoder assembly apparatus.

In a further aspect, an LST incorporating an encoding apparatus configured for carrying digital signals is paired with a decoding apparatus configured for carrying digital signals.

In a further aspect, an LST incorporating an encoding apparatus configured for carrying pulsatile signals is paired with a decoding apparatus configured for carrying digital signals.

In a further aspect, an LST incorporating an encoding apparatus configured for carrying digital signals is paired with a decoding apparatus configured for carrying pulsatile signals.

In a further aspect, an LST incorporating an encoding apparatus configured for carrying pulsatile signals is paired with a decoding apparatus configured for carrying pulsatile signals.

Those of skill in the art would understand that information and signals may be represented using any of a variety of technologies and techniques. For example, data, instructions, commands, information, signals, bits, samples, symbols, and chips may be referenced throughout the above description may be represented by voltages, currents, electromagnetic waves, magnetic fields or particles, optical fields or particles, or any combination thereof.

Those of skill in the art would further appreciate that the various illustrative logical blocks, modules, circuits, and algorithm steps described in connection with the embodiments disclosed herein may be implemented as electronic hardware, computer software or instructions, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm described in connection with the embodiments disclosed herein may be embodied directly in hardware, in a software module executed by a processor, or in a combination of the two. For a hardware implementation, processing may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. Software modules, also known as computer programs, computer codes, or instructions, may contain a number a number of source code or object code segments or instructions, and may reside in any computer readable medium such as a RAM memory, flash memory, ROM memory, EPROM memory, registers, hard disk, a removable disk, a CD-ROM, a DVD-ROM, a Blu-ray disc, or any other form of computer readable medium. In some aspects the computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media. In another aspect, the computer readable medium may be integral to the processor. The processor and the computer readable medium may reside in an ASIC or related device. The software codes may be stored in a memory unit and the processor may be configured to execute them. The memory unit may be implemented within the processor or external to the processor, in which case it can be communicatively coupled to the processor via various means as is known in the art.

Further, it should be appreciated that modules and/or other appropriate means for performing the methods and techniques described herein can be downloaded and/or otherwise obtained by computing device. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a computing device can obtain the various methods upon coupling or providing the storage means to the device. Moreover, any other suitable technique for providing the methods and techniques described herein to a device can be utilized.

In one form the invention may comprise a computer program product for performing the method or operations presented herein. For example, such a computer program product may comprise a computer (or processor) readable medium having instructions stored (and/or encoded) thereon, the instructions being executable by one or more processors to perform the operations described herein. For certain aspects, the computer program product may include packaging material.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The system may be a computer implemented system comprising of a display device, a processor and a memory and an input device. The memory may comprise instructions to cause the processor to execute a method described herein. The processor memory and display device may be included in a standard computing device, such as a desktop computer, a portable computing device such as a laptop computer or tablet, or they may be included in a customised device or system. The computing device may be a unitary computing or programmable device, or a distributed device comprising several components operatively (or functionally) connected via wired or wireless connections. An embodiment of a computing device comprises a central processing unit (CPU), a memory, a display apparatus, and may include an input device such as keyboard, mouse, etc. The CPU comprises an Input/Output Interface, an Arithmetic and Logic Unit (ALU) and a Control Unit and Program Counter element which is in communication with input and output devices (eg input device and display apparatus) through the Input/Output Interface. The Input/Output Interface may comprise a network interface and/or communications module for communicating with an equivalent communications module in another device using a predefined communications protocol (e.g. Bluetooth, Zigbee, IEEE 802.15, IEEE 802.11, TCP/IP, UDP, etc). A graphical processing unit (GPU) may also be included. The display apparatus may comprise a flat screen display (eg LCD, LED, plasma, touch screen, etc), a projector, CRT, etc. The computing device may comprise a single CPU (core) or multiple CPU's (multiple core), or multiple processors. The computing device may use a parallel processor, a vector processor, or be a distributed computing device. The memory is operatively coupled to the processor(s) and may comprise RAM and ROM components, and may be provided within or external to the device. The memory may be used to store the operating system and additional software modules or instructions. The processor(s) may be configured to load and executed the software modules or instructions stored in the memory.

BRIEF DESCRIPTIONS OF FIGURES

Figure 4:
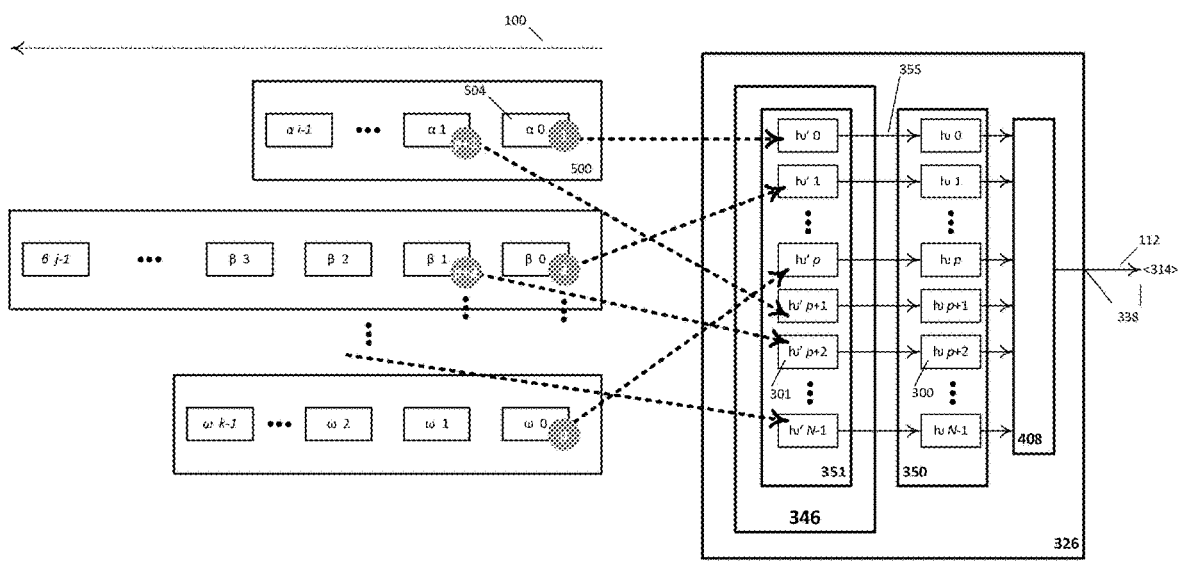
Figure 5:
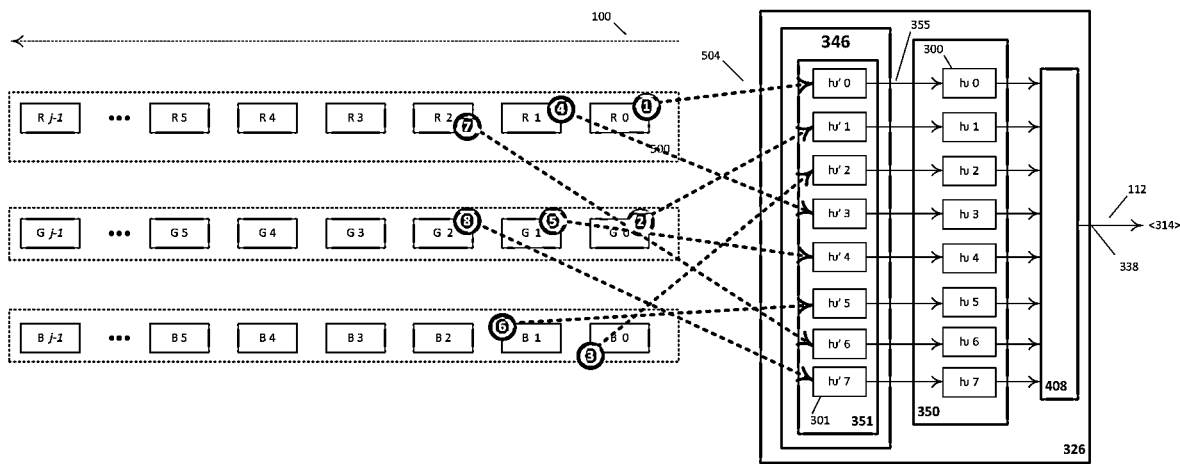
Figure 6:
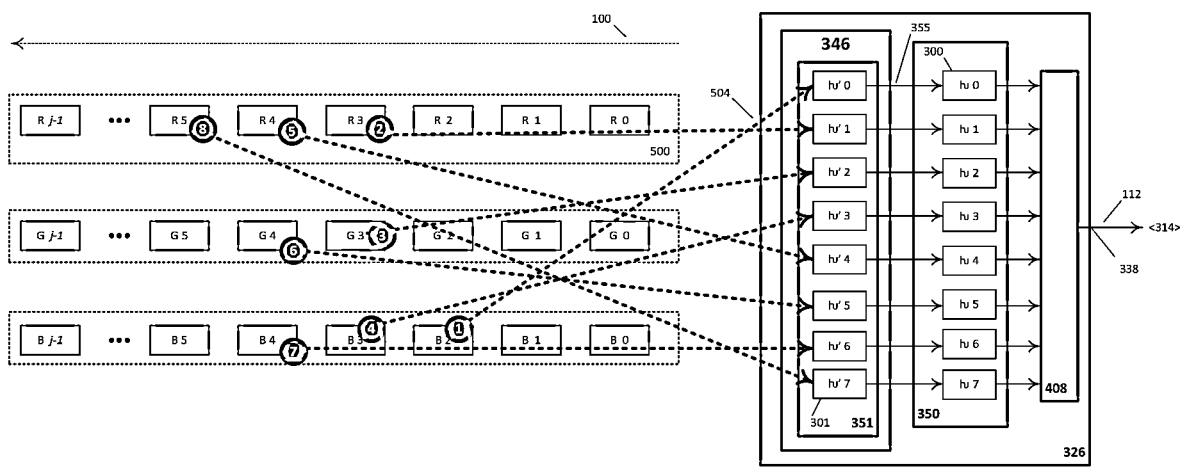
Figure 7:
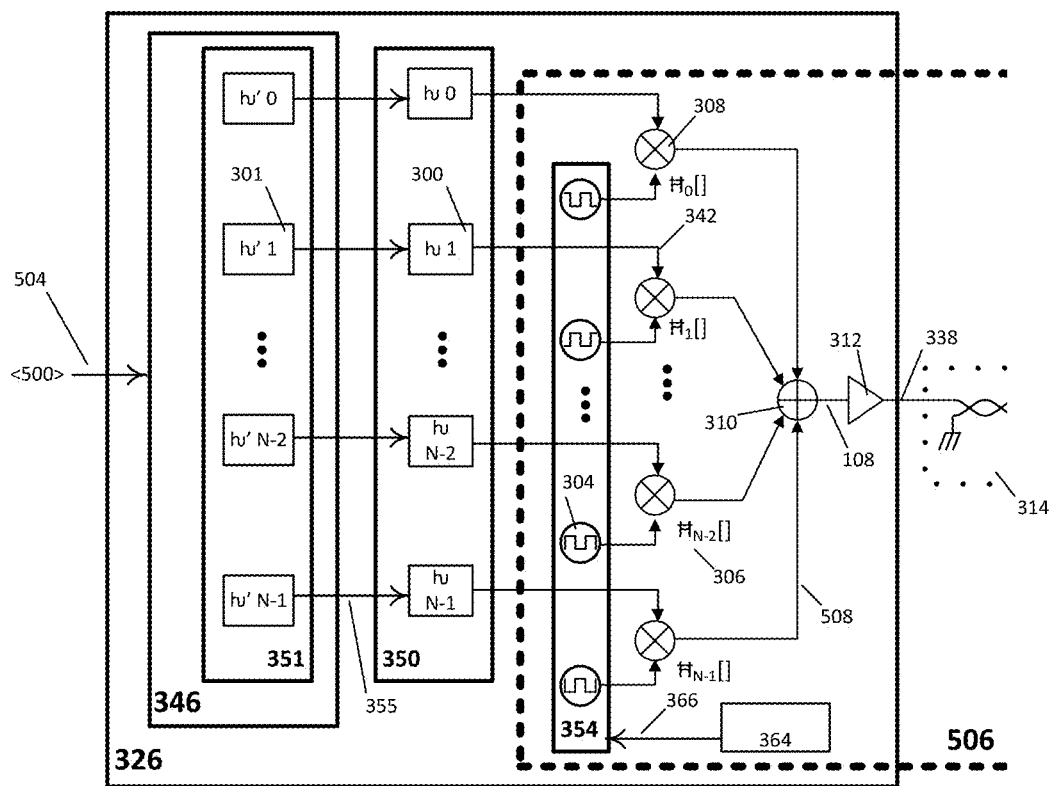
Figure 8:
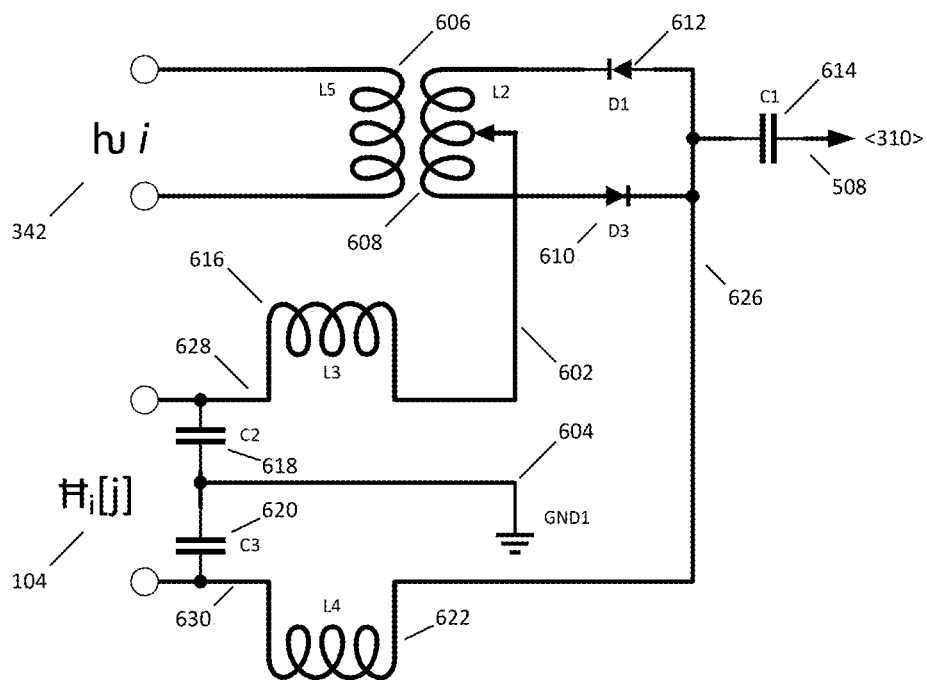
Figure 9:
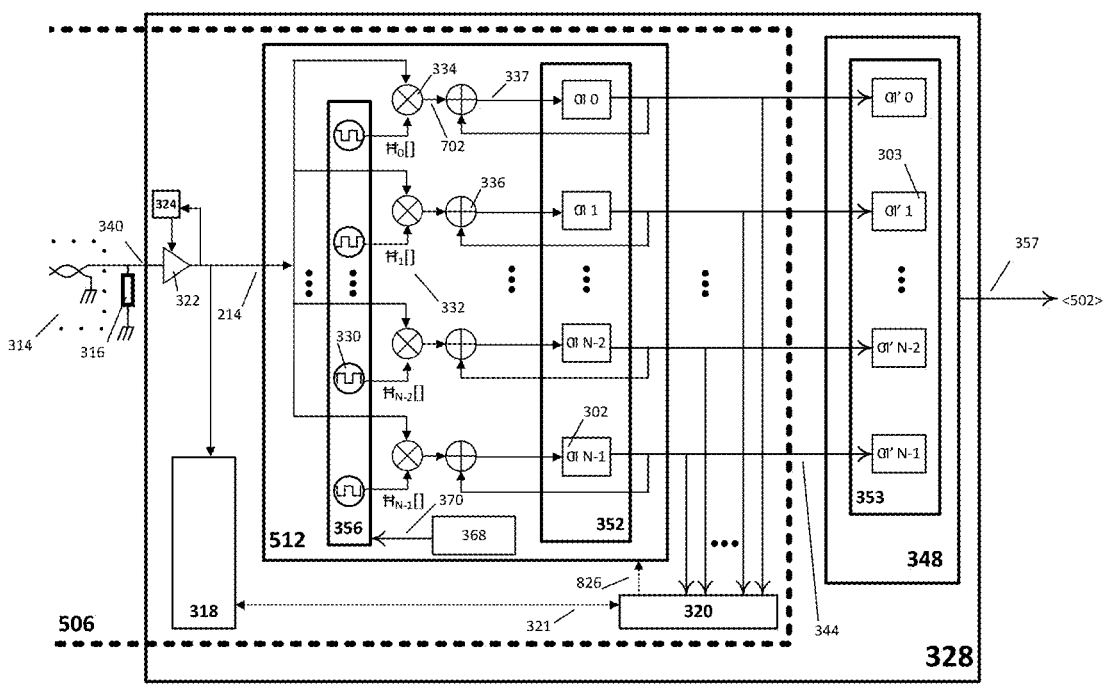
Figure 10:
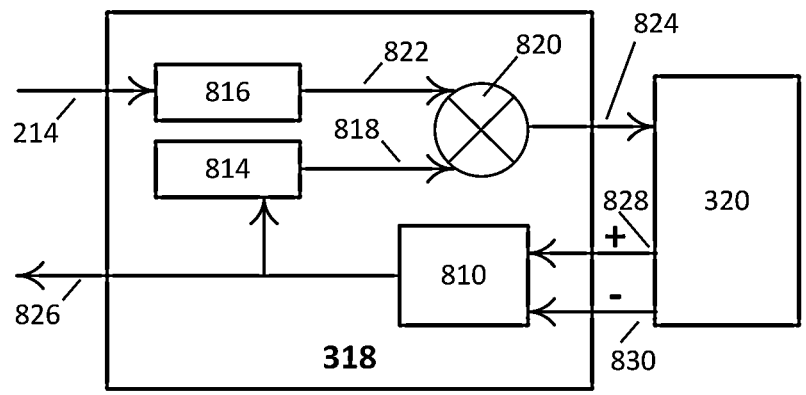
Figure 11:
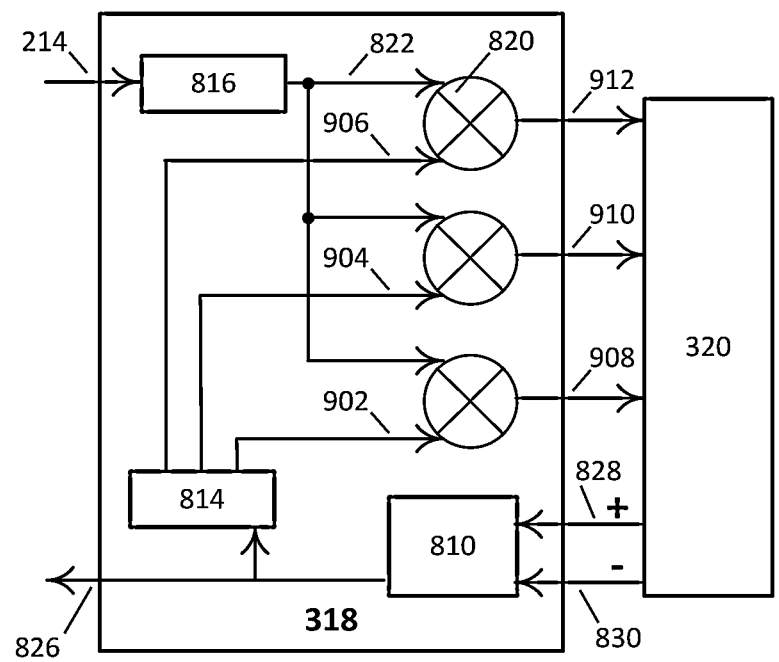
Figure 12:
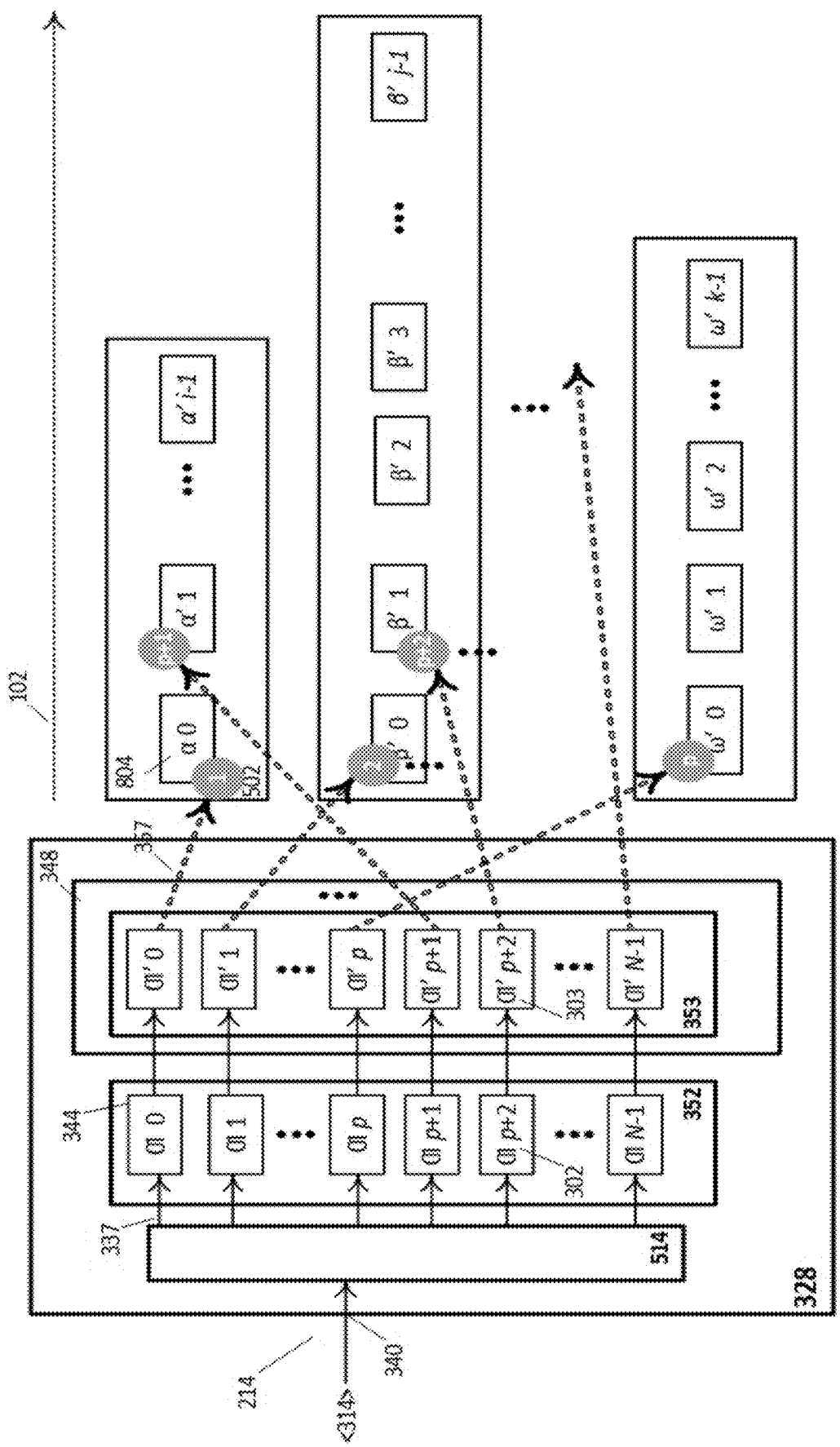
Figure 13:
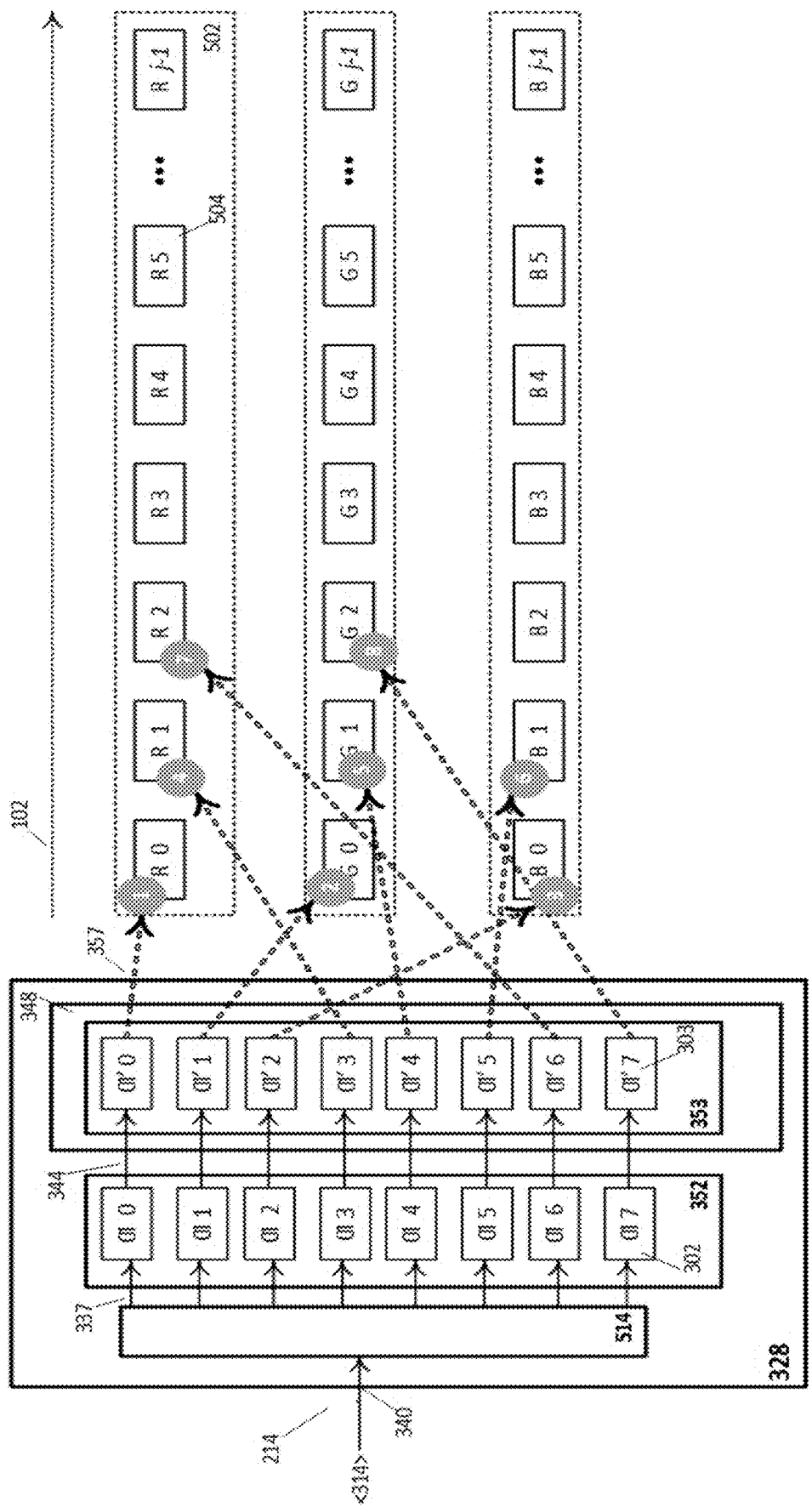
Figure 14:
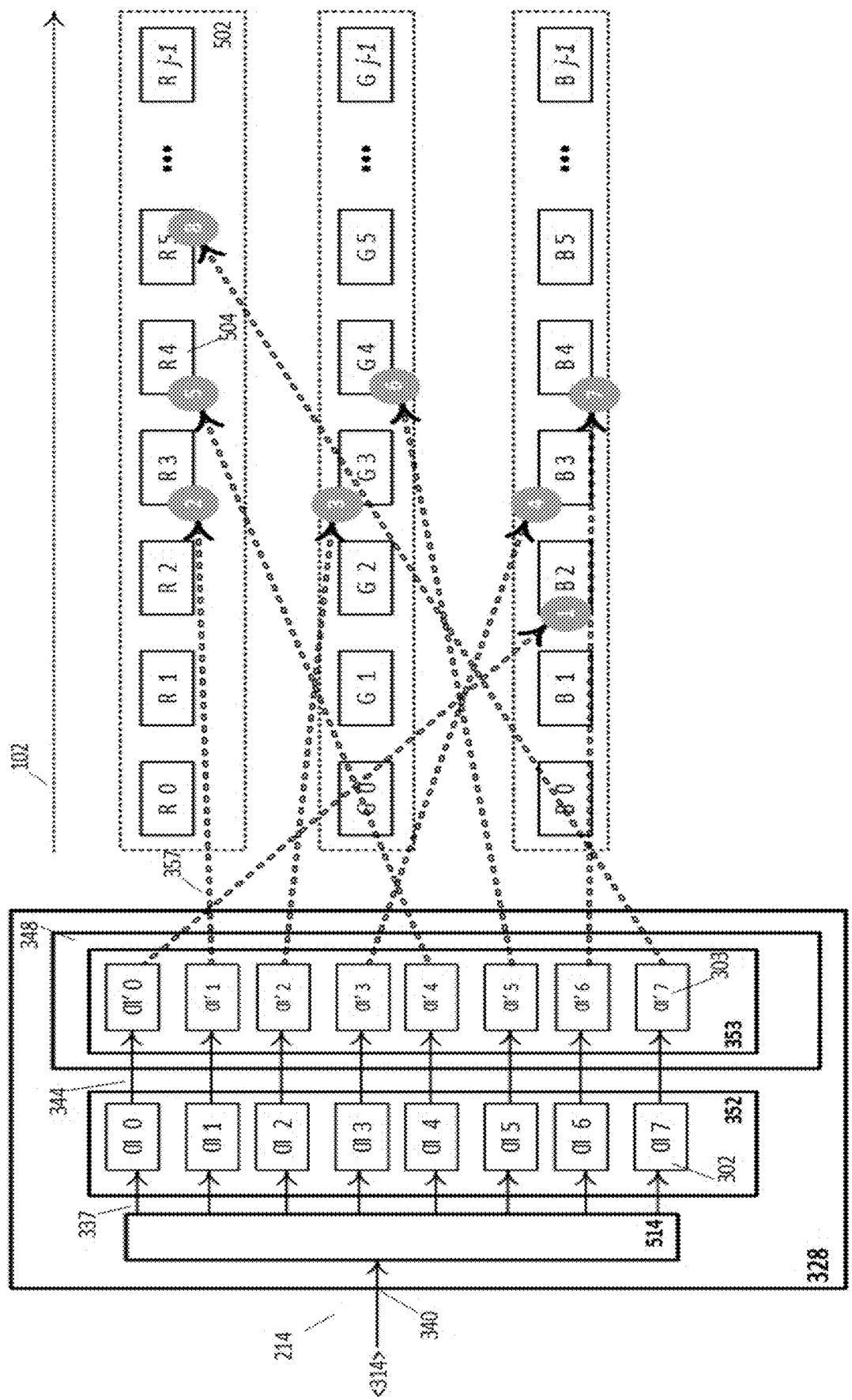
Figures 15, 16:
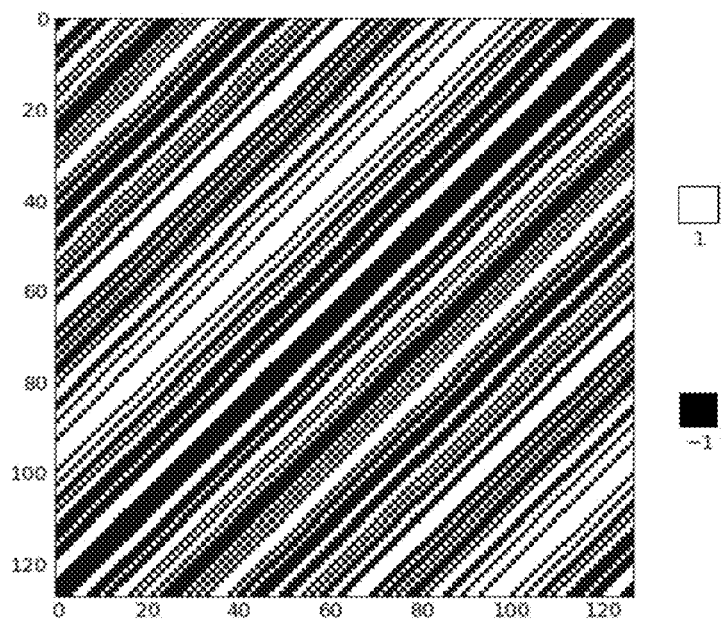
Figure 17:
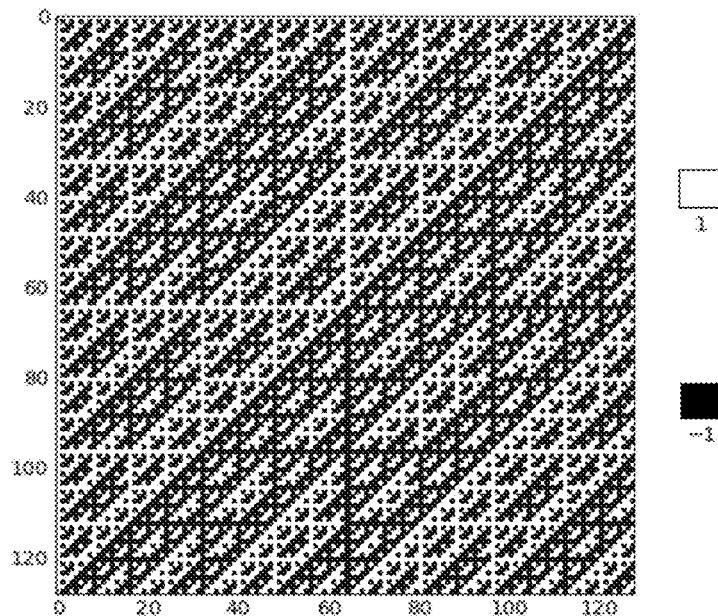
Figure 18:
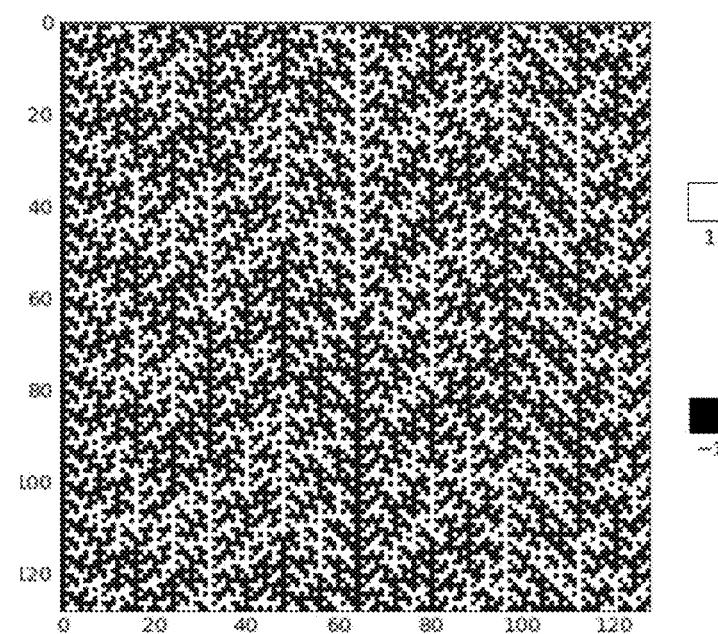
Figure 19:
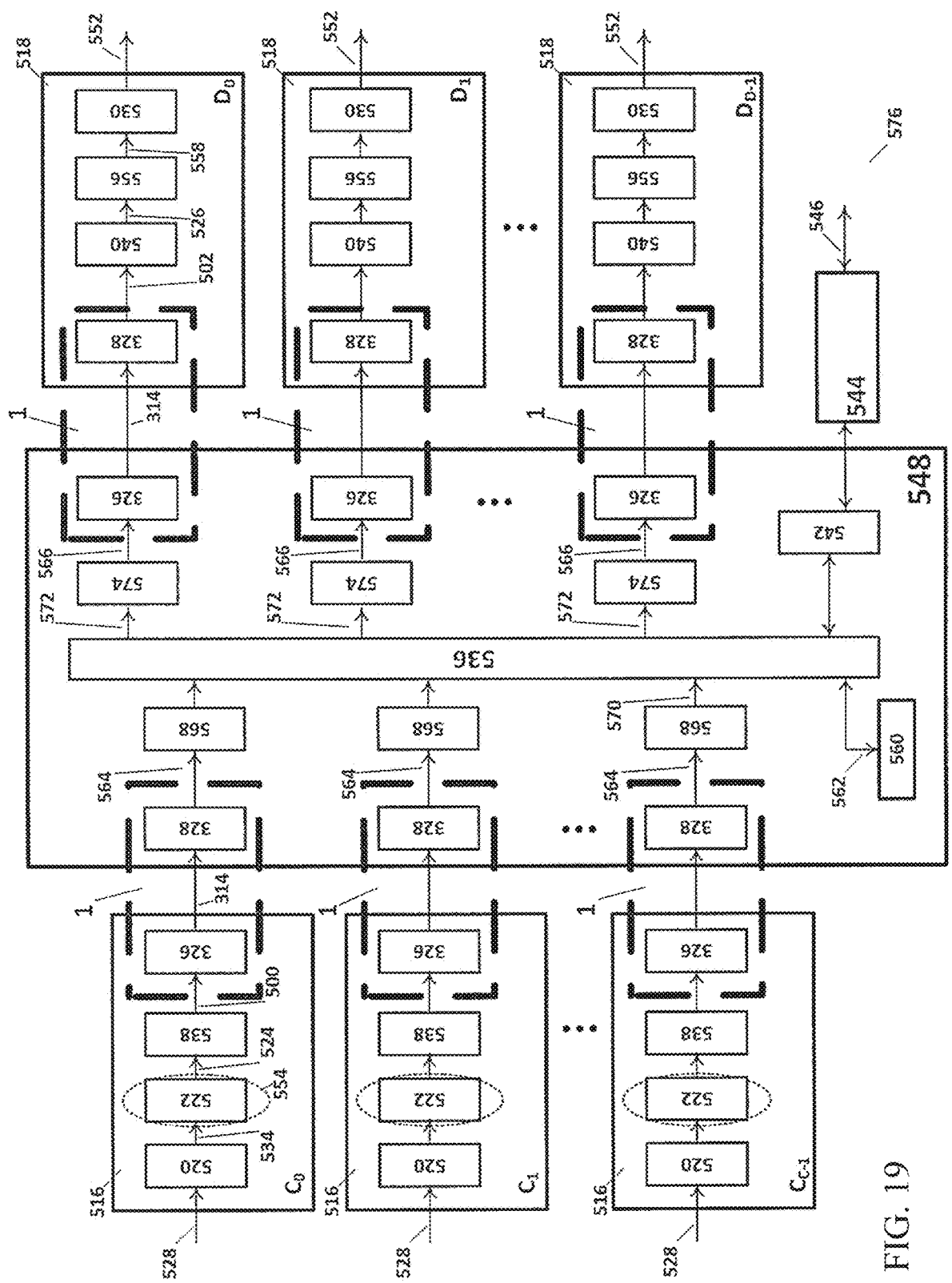
Figure 20:
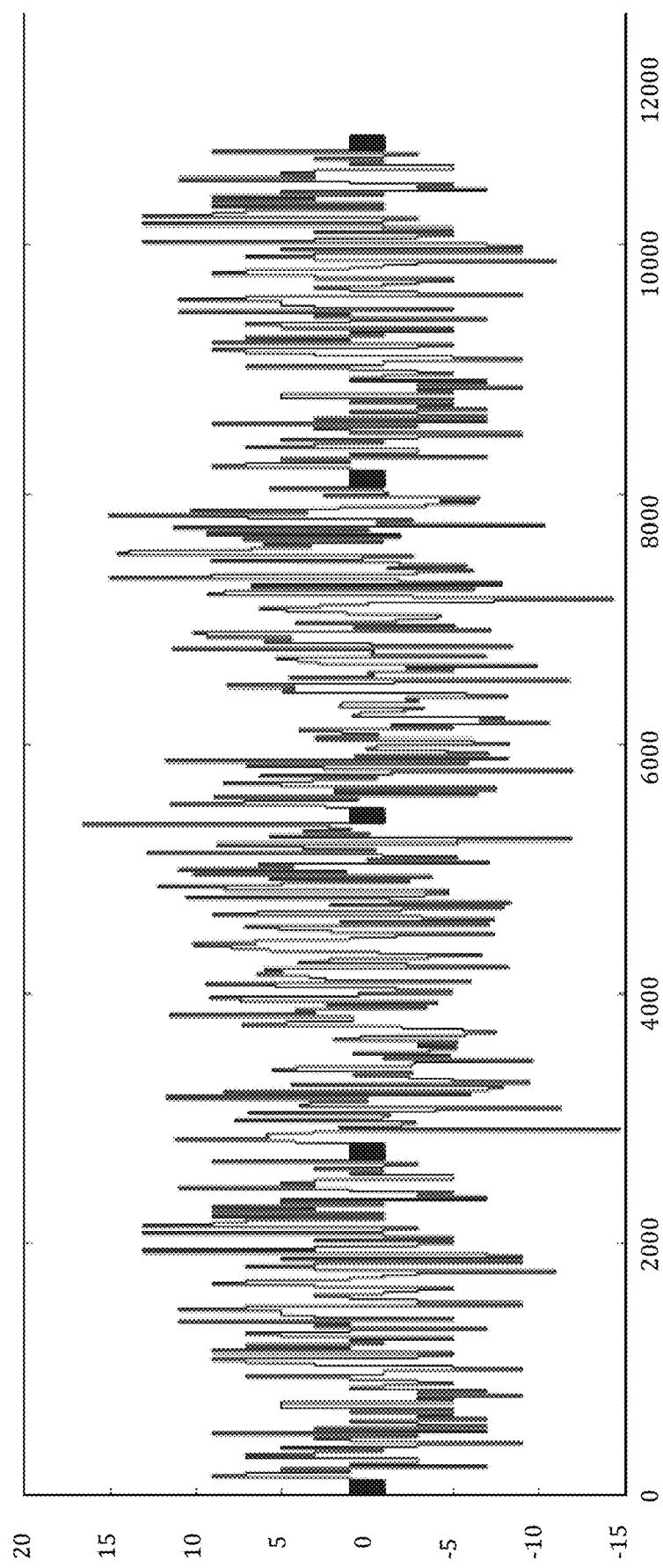

FIG. 4 describes one particular permutation, the permutation being a mapping from input payload snippet indices to encoder input vector indices, the example shown being round-robin assignment;

FIG. 5 illustrates an example round-robin permutation from indices in snippets of a parallel-RGB input video signal to indices in an 8-element encoder input vector, for the first transport interval for a given payload;

FIG. 6 further illustrates the example round-robin permutation from indices in snippets of a parallel-RGB input video signal to indices in an 8-element encoder input vector, for the second transport interval for the given payload;

FIG. 7 shows an apparatus for encoding an N-sample input vector as an L-time-interval series of output values that are transmitted;

FIG. 8 depicts an example of a commutating modulator;

FIG. 9 illustrates an apparatus for decoding an N-sample output vector from an L-time-interval series of input values that are received;

FIG. 10 shows the architecture of one synchronization acquisition and tracking circuit;

FIG. 11 shows the architecture of an alternative synchronization acquisition and tracking circuit;

FIG. 12 describes one particular round-robin assignment of decoder output vector indices to snippets of reconstructed payload signals;

FIG. 13 illustrates an example round-robin permutation from indices in an 8-element decoder output vector to indices in snippets of a reconstructed parallel-RGB output video signal, for the first transport interval for a given payload;

FIG. 14 further illustrates the example round-robin permutation from indices in an 8-element decoder output vector to indices in snippets of a reconstructed parallel-RGB output video signal, for the second transport interval;

FIG. 15 shows the schema of one binary Code Book that is a subset of the identity matrix;

FIG. 16 shows an example of a 127×127 binary code book whose codes is each a unique rotation of a common PN sequence;

FIG. 17 shows an example of a 128×128 binary code book, which is a Walsh-Hadamard matrix;

FIG. 18 shows an example of a 128×128 binary code book, which is constructed by element-wise multiplying each row of a Walsh-Hadamard matrix with a common near-PN sequence;

FIG. 19 depicts the interconnections amongst the constituents of a signal collection, processing, and presentation system; and FIG. 20 shows an example oscilloscope trace of a signal arriving from the EM pathway at the decoder assembly input terminal.

GLOSSARY

Terms relating to the widely understood Spread Spectrum transmission system are defined and elaborated upon in "Spread Spectrum Systems with Commercial Applications" by Robert C. Dixon, volume 3, Wiley & Sons 1994.

| Term | Definition |
|---|---|
| Signal | A fluctuating quantity conveying information |
| Sensory Signal | A signal capable of being interpreted by the human neural system (for example, light for the eyes, sound for the ears, pressure for the touch, chemicals for the taste, etc.) |
| Perception | The brain's awareness, comprehension, or understanding of a received sensory signal |
| Color Space | An abstract mathematical model, which describes a color gamut as tuples of numbers, typically as 3 or 4 components (examples include RGB, YUV, YCbCr, and CMYK) |
| Color Value | A signal amplitude corresponding to a basis vector in a color space |
| Pixel | A mathematical object associated with a geometric location in a 2D plane; a pixel is completely described as a set of Color Values, equivalently, a vector in a color space |
| Image | A 2-dimensional array of Color Values |
| Video | A sequence of Images in a predetermined electronic format which, when presented to a human viewer with sufficient rapidity, induces perception of motion and continuity |
| "analog" | Representation of a Signal<br>A physical quantity. Physical quantities change continuously over time, and the number of different amplitudes available is limited by our ability to measure energy. Examples of analog representations of a signal include:<br>Image sensor: Capacitance<br>(at each "pixel" in the sensor: conditionally discharge a capacitor through a photodiode for a predetermined exposure interval; the brighter that portion of the focal area, the less charge remains in the capacitor after the exposure interval)<br>LED/LCD display: current<br>(the brightness of each "pixel" in the display (the smallest controllable portion) is determined by a control current any given moment) |
| "digital" | Representation of a Signal<br>A number that changes at predetermined intervals. Examples of digital representations of a signal include:<br>PC: An R or G or B entry in a TIF file<br>Serial digital Interface: An ordered series of bits in a predetermined format |
| N | Number of elements in an encoder input vector and the corresponding decoder output vector . . . >1 |
| L | The common number of Chips in each code, equivalently, the number of Chip intervals applied during each encoding interval or decoding interval. L can be any counting number. The bigger L is than N, the more electrical resilience is afforded to the conveyed payload |
| Payload | The set of sampled signals that is the subject of transport |
| Snippet | A finite, ordered series of successive samples from a signal |
| (Input or Output) Vector | A finite, ordered series of samples collected from, or distributed to, payload snippets. The vector comprises N values. |
| Imperfect Medium | A physical electromagnetic (EM) propagation pathway and its environment, which combine to cause received values not to equal transmitted values, thus creating errors |
| EM Pathway | Imperfect medium. The subject of this disclosure probably works best with waveguides, because it relies on using all bandwidth and dynamic range available in the EM pathway |
| Waveguide | An EM pathway that physically constrains and confines the EM propagation vectors |
| Code | A pre-determined sequence of Chips that is L Chips long. |
| Chip | A value from a predetermined set of possible values. |
| Chip Interval | The period of time allocated for the application of one Chip in the encoder or decoder. Encoder Chip interval = encoding interval/L, and decoder Chip interval = decoding interval/L |

| | |
|---|---|
| Transport interval | The period of time allocated for simultaneously transmitting and receiving EM propagation across the EM pathway |
| Binary Code | a Code wherein the Chips are binary values |
| Binary Chip | The possible values are −1 or +1. (One might expect 0 or +1. Binary Chip values are −1 and +1 so as to facilitate balanced direct sequence modulation.) |
| PN Sequence | A (Binary?) Code whose output exhibits spectral characteristics similar to those of white noise. "PN" stands for "Pseudo Noise." An ideal PN Sequence's signal energy is uniform across the transmission spectrum; such that its Fourier Transform looks like a fine-tooth comb, with equal energy at every frequency. (NB: Not all Codes are PN Sequences) |
| Spreading | A property of individual Codes, and the effect of modulating a signal by a PN Sequence: A signal modulated by an ideal PN Sequence exhibits spectral characteristics similar to those of white noise |
| Spreading Code | PN Sequence (NB: Not all PN Sequences "spread" ideally) |
| Spreading Ratio | =L<br>=The number of successive Chips modulating each input sample<br>=The number of successive Chips demodulating the ordered series of received values to decode the output vector<br>=Spreading Factor (Dixon uses the terms "Spreading Ratio" and "Spreading Factor" interchangeably)<br>=SSDS process gain<br>=Code length<br>=Chip sequence length<br>=The number of encoder Chips modulating each sample in the input vector<br>=The number of decoder Chip correlations contributing to each sample in the output vector |
| Orthogonality | A property of sets of Codes ("Code Books"). A Code Book is considered orthogonal if all of its N codes are pair-wise uncorrelated and independent sequences. (An orthogonal Code Book minimize inter-track interference among N tracks.) |
| Walsh-Hadamard Code Set | A set of PN Sequences wherein each Code constitutes an orthonormal basis vector for the L-dimensional space of Codes. For any two Codes in the set, the cross product is 0, representing nil cross-correlation. For any Code in the set, the self-product is 1, representing 100% auto-correlation. |

DETAILED DESCRIPTION OF EMBODIMENTS

The embodiments provided disclose ways in which certain methods and apparatus are used and useable in a range of environments.

Figure 1:
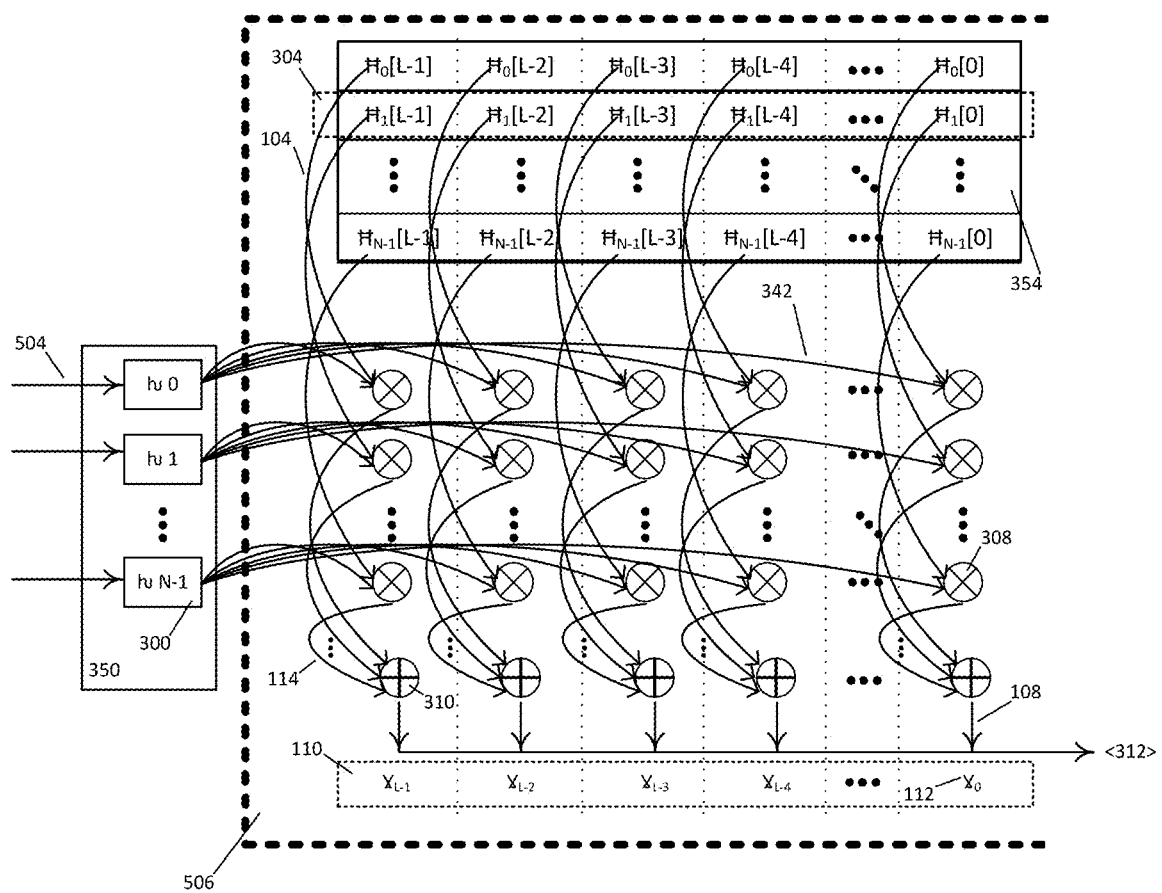
FIG. 1 depicts a method for collecting an input vector from a set of payload snippets, encoding the vector as an ordered series of output values, and making available the output values for transmission over an imperfect EM pathway.

An embodiment of an encoding method and apparatus is depicted in FIG. 1 wherein the method repeats, for each Chip interval τ and, equivalently, for each common index in the Codes of a predetermined code book of indexed Chips, the steps of the method comprise but are not limited to the steps of:

i) Modulating 308 each input sample 300 by the commonly indexed Chip 104 in the Code 304 corresponding to the index in the input vector 350. If the payload signals are pulsatile, then the samples are continuous values and an embodiment of modulation is an analog multiplication. If the Codes are binary (1/−1), then an embodiment of analog modulation is a conditional inversion. If the payload signals are digital, then the samples are numbers and an embodiment of modulation is a digital multiplier. If the Codes are binary (1/−1), then an embodiment of the digital multiplier is a conditional negation;

ii) Summing 310 the modulation results 114 from step i) to form one of the ordered series 110 of output values 112 for transmission. If the payload signals are pulsatile, then the modulation results are continuous values and the summing is a summing circuit. If the payload signals are digital, then the modulation results are numbers, and the summing is an adder;

iii) Making available the output 108 produced by step ii), at a rate sufficient to enumerate all of the code 304 indices within the Encoding Interval 12. The making available is achieved in many ways, one example is to provide the output on a port, another alternative is to store the output into a memory upon which a reading can be executed to make the output available.

By following the steps disclosed to produce one value for each code 304 index during each chip interval τ during the encoding interval 12, the ordered series 110 of values 112 resulting from step iii) represents the input vector 350. This process is achieved for each encoding interval, such that the method described can be repeated for successive input vectors.

In a preferred embodiment of the method of FIG. 1, the code book 354 is a set of N mutually orthogonal L-Chip 104 Codes 304, each of which is a Spreading Code. The L indices of the Codes correspond to the L chip intervals τ allocated during the encoding interval. The ratio L/N is the "SSDS Process Gain" as defined by Dixon on p. 6. This ratio captures a trade-off wherein the electrical resilience conferred to each sample in the input vector grows with the ratio between L and N. Available implementation technology places an upper limit on L. The larger N, the higher the bandwidth of payloads that can be accommodated. A designer is therefore motivated to make N very large. However, fixed L means that increasing N decreases the electrical resilience conferred to each sample in the input vector. In a preferred embodiment, L≥N.

The encoding method of FIG. 1 repeats, for each chip interval τ and, equivalently, for each common index in the Codes, the steps of:

i) modulating 308 each input sample 300 by the commonly indexed Chip 104 in the Code 304 corresponding to the input signal value's index in the input vector 350. If the payload signals are pulsatile, then the samples are continuous values and an embodiment of modulating is analog multiplication. If the Codes are binary (1/−1), then an embodiment of analog multiplication is conditional inversion. If the payload signals are digital, then the samples are numbers and an embodiment of modulating is digital multiplication. If the Codes are binary (1/−1), then an embodiment of digital multiplication is conditional negation, ii) summing 310 the modulation results 114 from step i) to form one of the ordered series 110 of output values 112, and iii) making available the output 108 produced by step ii), at a rate sufficient to enumerate all of the code 304 indices within the predetermined encoding interval, wherein the ordered series 110 of values 112 resulting from step iii), one value for each code 304 index, in its entirety represents the input vector 350 within the predetermined number L of chip intervals τ.

Only the signals appearing entirely within the high-speed time domain indicator 506 in FIG. 1 change during the process of encoding the input vector 350.

Figure 2:
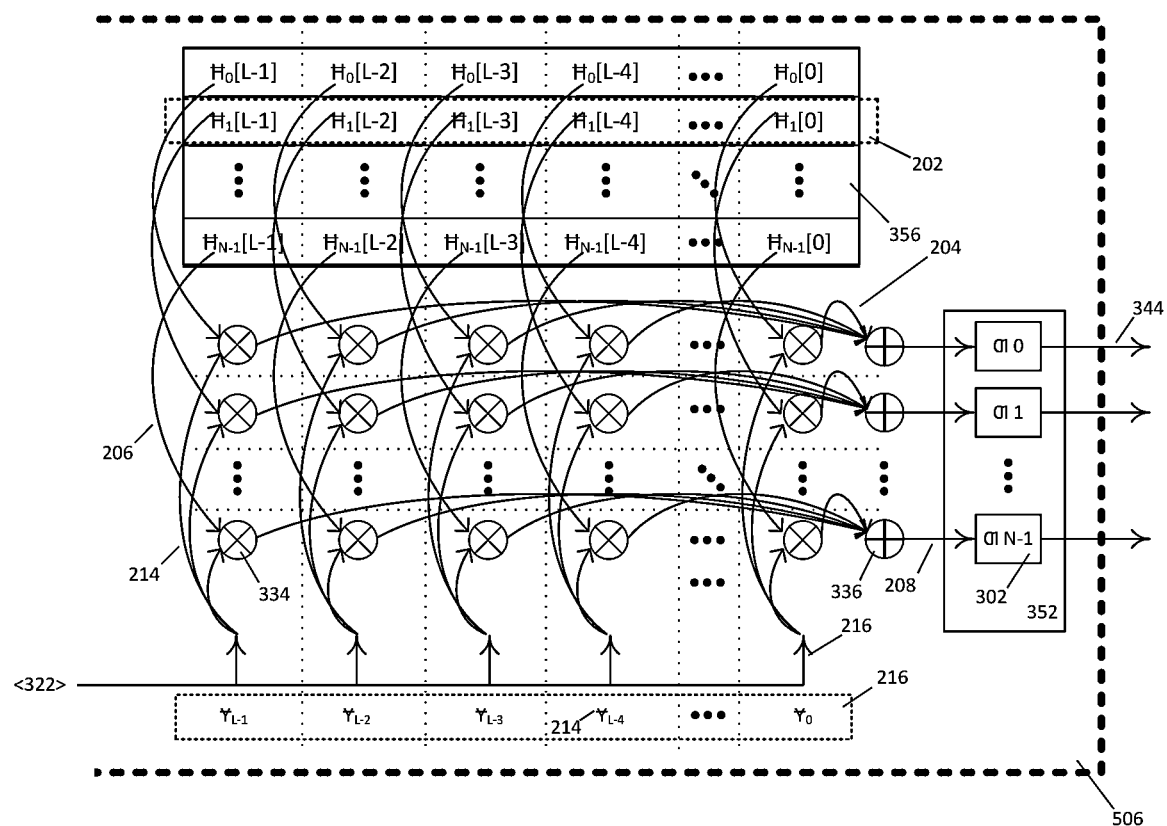
FIG. 2 depicts a method for decoding receiving an ordered series of input values from an imperfect EM pathway, decoding the input series to form an output vector, and distributing the output vector to reconstructed payload snippets.

FIG. 2 depicts a receiving, decoding, and distributing method and apparatus for reconstructing payload snippets from a received waveform, wherein an L-chip-interval time series 216 of received values 214 is decoded to yield an N-element output vector 352 of output signal samples 302. A full set of output values is produced once, after the L chip intervals τ allocated to receive the output vector 352.

The decoding method of FIG. 2 relies on a code book 356. The code book is a set of N mutually orthogonal L-Chip 206 Codes 202, each of which should probably be a Spreading Code. The L indices of the Codes correspond to the L chip intervals τ allocated to receive the output vector 352.

At the beginning of each decoding cycle (on ¥0), initialize the output values 302 each to 0.

During each chip interval τ, the received value 214 is correlated 334 by the correspondingly indexed Chip 206 of the Code 202 whose index in the code book 356 corresponds to the index of the output value 302 in the output vector 352. If the payload signals are pulsatile, then the samples are continuous values and an embodiment of correlating is analog multiplication. If the Codes are binary (1/−1), then an embodiment of analog multiplication is conditional inversion. If the payload signals are digital, then the samples are numbers and an embodiment of correlating is digital multiplication. If the Codes are binary (1/−1), then an embodiment of digital multiplication is conditional negation.

All L correlation results 204 at each input vector 350 index are summed 336 over the course of the encoding interval 2 to yield the respective output sample 302.

The output vector 352 contains the reconstructed payload samples after the L chip intervals τ allocated to receive the output vector and makes them available as output vector values 344. The making available is adapted to any form of intra-equipment signalling.

Only the signals appearing entirely within the high-speed time domain indicator 506 in FIG. 2 change during the process of encoding the output vector 352.

Local-Site Transport of sample signals involves repeating this sequence of steps, potentially endlessly:

Assembling an Input Vector from Input Payload Snippets;
Encoding the Input Vector into a Transmitted Signal under control of Code Book;
Transporting the Signal, which involves two concurrent activities;
  Transmitting the Signal (in the encoder assembly 326), and
  Receiving the Signal (in the decoder assembly 328);
Decoding the Received Signal into the Output Vector, under control of the Code Book; and
Distributing the Output Vector into Reconstructed Payload Snippets.

Figure 3:
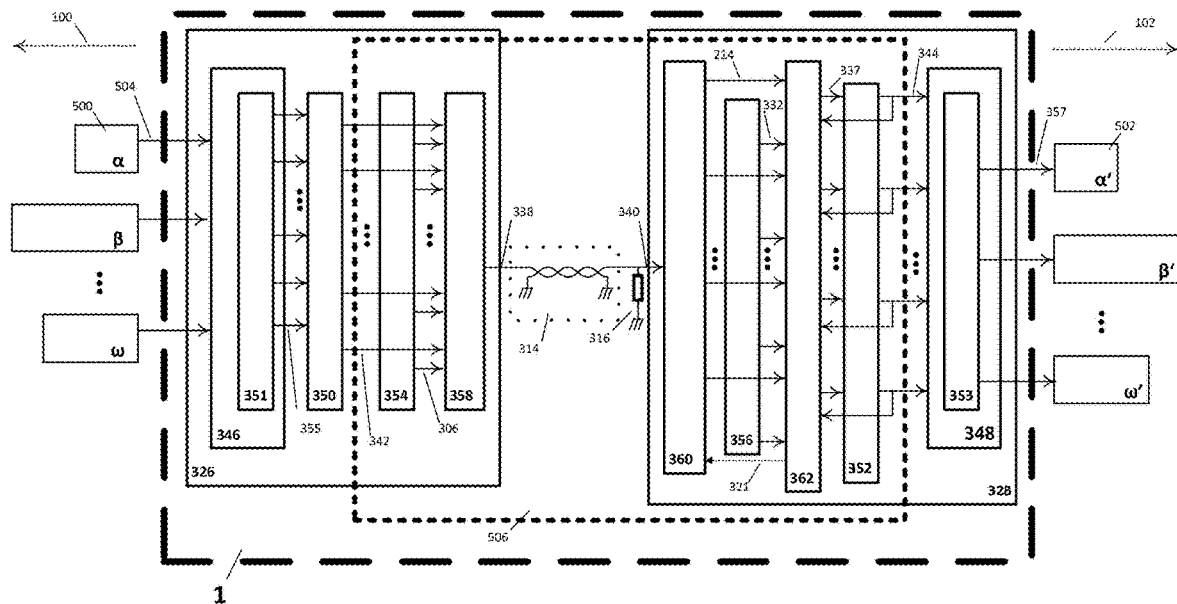
FIG. 3 illustrates a local-site transport for snippets from one or more payload signals.

Referring now to FIG. 3, element 1 represents end-to-end local-site transport (LST) 1 for sampled payloads includes an encoder assembly 326 connected over an electromagnetic (EM) pathway 314 to a decoder assembly 328. The encoder assembly receives an ordered series of input samples 504 and produces an analog waveform on the EM pathway. The decoder assembly receives an analog waveform from the EM pathway and produces an ordered series of output values 344, each of which is an approximation of its corresponding payload value. All of the encoding and decoding operations take place over the L steps of a predetermined transport interval, within the indicated high-speed time domain 506. In an embodiment, the EM pathway is a waveguide, enabling the maximum amount of energy to be conveyed.

An encoder input vector 350 is assembled from successive samples 504 from each of one or more input payload signals 500 over a collecting interval 100 according to an arbitrary, pre-determined bijective encoder mapping function 346. The corresponding output payload signals 502 are assembled over a distributing interval 102 from the decoder output value vector 352 by a bijective decoder mapping function 348. In a preferred embodiment, the decoder mapping function is the inverse of the corresponding encoder mapping function.

The encoder assembly 326 transforms the encoder input vector 350 into a series of values transmitted via the EM pathway 314 to the decoder assembly 328. The EM pathway connects the encoder assembly output terminal 338 to the decoder assembly input terminal 340. An impedance 316 terminates the EM pathway at the decoder assembly input terminal. The decoder assembly receives the propagated signal from the EM pathway and transforms the sequence of received values into the decoder output vector 352.

The LST 1 shown in FIG. 3 is capable of injecting relatively large amounts of mains-supplied energy into the EM pathway 314. In an embodiment, the EM pathway is a waveguide.

Without loss of generality, it is apparent to one skilled in the art that while the system is described as transporting payloads from encoder assembly 326 to decoder assembly 328 that information may also flow in the opposite direction over the EM pathway 314 with the implementation of a secondary decoder parallel to primary encoder 326 and attached to the transmission medium at 338 receiving information from a secondary encoder block parallel to primary decoder 328 and driving the line at 340 to implement bi-directional transmission of information, either digital or pulsatile. The primary distinction of primary vs. secondary encoder/decoder is a distinction of amount of information flow. The secondary information flow being for example command and control signals, audio signals to drive a speaker or similar apparatus. This is known as UTC (Up The Cable) communications and is comprised of much lower information content. With the use of a separate code sequence for the UTC communications the information in the form of digital or pulsatile signals may flow in the opposite direction, such separate code sequence being orthogonal to the primary code sequences.

FIG. 4 illustrates one of the N! possible permutations of the permuter 346 between Collection Interval 500 samples 504 and encoder input vector 350 positions 300. This schema allows for any number of payload signals in the list implied by the ellipses between β and ω on the left-hand side of the drawing, and for each payload signal to contribute any number of samples from its snippet to the input vector during each Collection Interval.

FIG. 4 shows a straightforward round-robin permutation performed within the permuter 346, wherein a next sample from each signal 500 in the set of payload signals 504 α, β, ..., ω is assigned in turn to the next available index in the encoder input vector 350, until all N input vector locations 300 have been filled. The numbered circles indicate the order in which the input payload snippet samples are selected for including in the encoder input vector. Exactly N samples are collected during the Collection Interval.

Although there are N! equally good choices for permutation implemented by the permuter 346, the decoder permuter 348 implements the inverse of the permutation implemented by the corresponding encoder. Ensuring agreement regarding such details is the subject of international standards, for future implementation.

The schema drawn in FIG. 4 applies to many possible types of signal. For example, there could be a single payload signal, consisting of a representation of video wherein each successive sample is a color value (for example, 3 (R/G/B) per pixel). Another example is also a single payload signal, this one payload signal consisting of color values from several interleaved independent video signals. Further examples include diverse types of signal, for example, video, audio, chemical, mechanical/haptic, and so forth. An embodiment of one such hybrid example includes different numbers of samples from/to each payload signal during each transport interval. Further examples include each of the four types of signal (digital, analog, pulsatile, and neural) solo or in concert.

FIG. 5 illustrates an especially common special case of the general schema described in FIG. 4. In this example, the payload consists of 3 signals 500, representing the R, G, and B color planes, respectively, of a single RGB-based video signal. N, the number of elements in the encoder input vector 350, happens to be 8. This example shows the round-robin assignment during the transmission of a first transport interval.

Further to the example begun in FIG. 5, FIG. 6 illustrates round-robin assignment during the transmission of the second transport interval.

Referring now to FIG. 7, an encoder assembly 326 receives input signal samples 504 from mapping 346 and drives a signal through its output terminal 338 onto an EM pathway 314. The encoder assembly includes an input vector memory 350 for receiving and storing all of the input signal samples and a Code Book memory 354 for receiving and storing a predetermined code set, one Code 304 associated with each input sample 300.

The encoder assembly 326 data path features a plurality of modulators 308, one per input sample 300, which is re-used over and over, once per chip interval τ. On each cycle of the transmit clock in the high-speed domain 506, each modulator applies the correspondingly indexed Chip 306 to its correspondingly indexed input sample, and the summing circuit 310 combines all modulator outputs 508 to produce a next value 108 for transmission by the line driver 312 via the output terminal 338 into the EM pathway 314. In an embodiment, the EM pathway is a waveguide, enabling the maximum amount of energy to be conveyed.

If the input payload signals 500 are pulsatile, then the input samples 301 are continuous values and an embodiment of the modulator 308 is an analog multiplier. If the Codes 330 are binary (1/-1), then an embodiment of the analog modulator is a conditional inverter. If the payload signals are digital, then the samples are numbers and an embodiment of the modulator is a digital multiplier. If the Codes are binary (1/-1), then an embodiment of the digital multiplier is a conditional negater.

An application payload signal 500 of longer duration than a single collecting interval 100 is encoded over the course of several collecting intervals and thus over the course of a corresponding number of encoding intervals 12 as well as a corresponding number of transport intervals 2. In a preferred embodiment, the parameters defining the encoder assembly 326, including collecting interval, encoding interval, transport interval, N 8, L 10, code book 354, and permuter 346 permutation all remain constant throughout the steps involved in the processing of one set of input payload samples 504 corresponding to a single set of input vector 350 contents. In one embodiment of the encoder assembly, all of the encoding parameters are "hard coded" and cannot be changed. Because the encoding of one input vector is logically independent from the encodings of all previous and of all following input vectors, the encoding parameters may change from one input vector's worth of payload samples to the next. Therefore, in another embodiment of the encoder assembly, any of the encoding parameters may be varied from one collecting interval to the next under algorithmic control, for example in response to changes in payload characteristics, EM pathway 314 characteristics, and/or application requirements.

For a digital embodiment of the encoder modulator 308 wherein the encoder Chips 306 happen to be constrained to be binary (for example, 1 and 0), one embodiment of the modulator comprises a combinatorial circuit that inverts the signed integer representation of each input sample 342. A corresponding embodiment of the line driver 312 effects a digital to analog conversion.

For an analog embodiment of the encoder modulator 308 wherein the encoder Chips 306 happen to be constrained to be binary (for example, 1 and -1), one modulator embodiment comprises a commutating modulator, such as the example shown in FIG. 8.

The example modulator 308 shown in FIG. 8 applies the Chip input 104 to the corresponding input sample 342 to produce modulated output 508. This style of modulator, known as a commutating modulator, inverts the input sample 342 based upon the polarity of the Chip input 104. Coupled inductors 606 and 608 impose a galvanically isolated copy of the input sample 342 across commutation diodes 612 and 610 relative to a center tap connected to signal 602, each of diodes 612 and 610 conduct in turn based upon the polarity of bias imposed by signal 626. The Chip input 104 imposes a differential signal to the center tap of inductor 608, and one of the terminals of inductor 608 through signal 628. In one of the two differential polarities of Chip input 104, current flows through inductor 622 to signal 626, then through forward biased diode 612 into inductor 608, out of the center tap of inductor 608 onto signal 602, through inductor 616 to complete the current loop, according to Kirchhoff's circuital laws. On the opposite polarity of Chip input 104, current flows through inductor 616 to signal 602 and thereby onto the center tap of inductor 608. The signal emerges from inductor 608 and flows through forward biased diode 610 and onto signal 626, whereupon the current travels back through inductor 622 thus again completing the current loop according to Kirchhoff's circuital laws. It should be noted that the circuit direction in these two cases flows in opposite directions. Capacitors 618 and 620 are DC removal capacitors that ensure that the direction of current flow in signal 628 is converted correctly to a positive or negative polarity and biases the inductor 608 accordingly. Input sample 342 is coupled onto the above mentioned biasing signal flows. This coupled signal then flows out of coupled inductor 608 and through one of two established paths originating from the center tap 602 and exiting from one or the other of the terminals of inductor 608, there by establishing positive and negative signal representation through polarity of biasing signal imposed on 626. Capacitor 614 is a DC blocking capacitor that removes DC components from output signal 624.

Referring now to FIG. 9, a decoder assembly 328 receives a signal from the EM pathway 314 at its input terminal 340. In an embodiment, the EM pathway is a waveguide, enabling the maximum amount of energy to be conveyed. The EM pathway is terminated by terminating impedance 316. The signal entering the decoder assembly is received by line amplifier 322, which is controlled through a feedback path by an equalizer 324.

The output vector 352 is developed by the decoder 512 over the course of the decoding interval by accumulating partial contributions in the storage elements 302 during each chip interval 500 of the concurrent high-speed operations taking place inside of area 506. For each output vector 352 index, the decoder assembly 328 also comprises one Code 330 at a corresponding index in the Code Book memory 356, one correlator 334, and one integrator 336.

Before beginning to decode an ordered series of received values, the output vector 352 entries 302 are cleared (by storing the value 0 in each. Subsequently, during each predetermined chip interval τ allocated to decoding the output vector, for each output vector index, correlate using the correlator 334 the received value 214 produced by line amplifier 322 with the correspondingly indexed Chip 332, and gather using the summing circuit 336 the correlation result 702 with the contents of the corresponding output sample memory 302.

For a digital embodiment of the decoder 512 wherein the Chips 332 happen to be constrained to be binary (for example, 1 and 0), one embodiment of a correlator 334 comprises a combinatorial circuit that inverts the signed integer representation of each received value 214 according to the Chip 332. A corresponding embodiment of the amplifier 322 effects an analog-to-digital conversion.

For an analog embodiment of the decoder 512 wherein the Chips happen to be constrained to be binary (for example, 1 and −1), a correlator might consist of an analog modulator, such as the example shown in FIG. 8.

The output of each correlator 334 is integrated, together with the contents of its corresponding output sample memory 302, by the corresponding integrator 336. For a digital embodiment of the decoder, the integrator might be a straightforward combinatorial adder. For an analog embodiment of the decoder, one embodiment of an integrator comprises an op-amp-based integrator.

If the reconstructed payload signals 502 are pulsatile, then the output samples 303 are continuous values and an embodiment of the correlator 334 is an analog multiplier. If the Codes 332 are binary (1/−1), then an embodiment of the analog correlator is a conditional inverter. If the payload signals are digital, then the samples are numbers and an embodiment of the correlator is a digital multiplier. If the Codes are binary (1/−1), then an embodiment of the digital correlator is a conditional negater.

The correlation spike detector 320 monitors the outputs of the array of decoder correlators 334. In one embodiment all decoder assembly 328 functional elements are synchronized by a clock recovery circuit 318, which monitors the output of the line amplifier 322 as well as the output of the correlation spike detector to acquire and track carrier synchronization.

SSDS is different from what is claimed in this disclosure:
  SSDS is a technology for communicating over long distances, versus the relatively limited distances spanned by LSTs.
  SSDS is applied when nearly every bit of a digital signal must be conveyed correctly, versus the satisficing approximations actually required of LSTs for many applications, including most human-viewing applications.
  SSDS is generally applied for single signal streams through an EM pathway which is often in free space, whereas LST carries one payload through an EM pathway which is often a waveguide.

SSDS-CDMA is different from what is taught in this disclosure:
  In prior SSDS-CDMA, the encoded values are transmitted asynchronously from one another; by contrast, the LST disclosed herein synchronously encodes all values in a vector of N payload signal sample values as a series of L values conveyed across the EM pathway.
  Prior SSDS-CDMA seeks to hide the transmitted signals in the ambient noise floor, for minimum energy consumption, minimum potentially harmful EM radiation, and minimum probability of intercept; by contrast, the LST disclosed herein sends the maximum energy into the EM pathway that is permitted by relevant FCC/CE/CCC regulations.
  Prior (bit-serial) SSDS-CDMA relies on Chip-phase-shifted Code variants to differentiate amongst transmitters; by contrast, the encoder and decoder pair claimed herein uses orthogonal Code Books to minimize Intertrack Interference (II).
    An orthogonal Code Book may contain non-spreading Codes. The Identity matrix (sketched in FIG. 15) is an example of one such Code Book.
    One embodiment of an orthogonal Code Book contains spreading Codes, such that 1) transmission of each input/output vector sample enjoys the resiliency benefits of SSDS against aggressors and 2) for signals destined for sensory perception, transforming electrical imperfections as well as any II into perceptually benign artifacts.

Acquisition and Tracking of Synchronization Information in SSDS-CDMA Systems

In any SSDS communication system, the receiver needs to be synchronized with the transmitter. Typically, the synchronization takes place in two parts: an initial coarse synchronization, also known as acquisition, followed by a finer synchronization, also known as tracking. There are many sources of error in the acquisition of synchronization, however in the embodiments disclosed herein, application issues of Doppler shift, multipath interference and some of the subtler effects which impact prior SSDS-CDMA are not present due to the relatively constrained nature of most infrastructure EM pathways.

There is an additional benefit in which the initial chip rate, also known as the repeat rate, during the transport interval will be controlled by crystal oscillators or other accurate time sources. On the receive side, there are also be similar crystal oscillators or other or other accurate time sources, such that the difference in the fundamental frequency will be on the order of only hundreds of parts per million. Additionally, the sequence lengths of the pseudo noise generation circuits are not overly large, inasmuch that the repeat length is relatively short. All these factors add up to a system that can be simple to implement, and therefore low cost.

The encoding/decoding system admits aforementioned simplifications, allowing us to forego a lengthy initial acquisition procedure. The receiver will be running close to the chip rate of the transmitter as well as the relative phase of the PN generator in the receiver can be easily acquired. In fact, the circuit implemented is simply a tracking system that acquires the relative phase of the receiver in respect to the transmitter with a slight variation on the ability to change frequency to match frequency of the transmission circuit.

The synchronization acquisition system can be described as a sliding correlator that takes as inputs the received signal from the media as well as output from a PN generator that is local to the receiver. The local PN generator is driven from a PLL or phase lock loop which has a narrow band of frequency diversity, i.e. it natively will run at close to the target frequency and has a band of control around that center frequency. The output from the sliding correlator is analyzed to determine whether or not a lock condition has been achieved or if the frequency is either too high or too low, this lock detector then drives a PLL to either speed up or slow down first to stay the same in a feedback loop.

The sliding correlator can be implemented as either a sampled and digitized representation of the incoming signal in which case the correlation is formed in digital logic. Another implementation of the sliding correlator can be as switched analog circuitry, in which in this case the incoming signal is sampled and the correlation is performed in switched capacitor circuitry.

One classical technique in the acquisition process would be to have course phase alignment accomplished through searching through the various taps or delays, of the receiver PN generator and subtle phase frequency alignment being accomplished to the PLL. However, in an embodiment of the system, the time required to search through all of the available taps in the PN sequence generator is relatively short. Classically one might search amongst the various taps of the PN generator to find a correlation spike that is relatively close and then fine-tune this correlation by changing the frequency of the PLL. Through this it becomes possible to accomplish both coarse and fine adjustments. Because an embodiment of the system is relatively unconstrained, it becomes possible simply to slide the phase by changing the frequency and accomplishing both the course and the fine adjustments through the changing of the PLL.

A further embodiment allows the transmitter to send a training sequence that has predetermined characteristics to facilitate synchronization acquisition and tracking. This training sequence may occur at the beginning of every grouping of data video data or it actually may exist as a sub band, i.e. modulated by a further code orthogonal to all of the codes in the code book applied to the payload snippets and transmitted at the same time, continuously. The independent training sequence, or sub-band, serves as a probe of the EM characteristics of the EM pathway, which may in turn be referenced for parametric tuning of signal correction circuits, such as pre-emphasis. Henceforth this signal is referred to as the "probe signal" without loss of generality. This probe signal may be held constant over k transport intervals, for some predetermined k, and its associated code made k*L chips long. As with the payload samples in the input vector, this probe signal may be implemented either with discrete (digital) or with continuous (pulsatile) representations. This approach enhances the resilience of the probe track to noise, interference, and reflections. In this application, the probe signal is particularly powerful in facilitating acquisition and tracking because the probe signal can be made to have a constant amplitude that allows channel attenuation to be measured directly.

Another preferred embodiment is the parallel correlation system shown in FIG. 11. This system analyzes adjacent taps in the PN sequence generator. By studying three adjacent taps and the correlation relating to each of those individual taps, the lock detection algorithm is greatly simplified.

In a further embodiment, the receiving circuit is adapted to retransmit a phase-aligned and synchronized signal back to the transmitting circuit in an independent sub-band. Completing the control loop in this manner allows the transmitter to transition, an embodiment, between providing the probe signal versus encoding payload snippets. Upon initial power-up, the transmitting circuit transmits the probe signal until it acquires a sub-band signal that is returned from the receiving circuit. When the returned signal is received, the transmitting circuit then starts transmitting data according to the received parameters. This closed-loop control system allows a robust and self-calibrating LST to be implemented.

LST Optimization

In an LST, a transmitter sends energy over an EM pathway to a receiver. The LST payload comprises one or more sampled signal snippets. For each set of payload snippets, the LST assembles an input vector, encodes the input vector, transmits a signal into the imperfect EM pathway, receives a signal from the other end of the EM pathway, decodes the received signal into an output vector, and distributes the output vector to reconstructed payload snippets. The exactness of the correspondence between the reconstructed payload and the input payload is determined entirely by the electrical quality of the EM pathway and by the encoder assembly and decoder assembly implementations.

The electrical quality of the EM pathway in turn depends both upon physical variation in materials and assemblies and upon environmental interference. As a result, the signal received at the decoder assembly differs from the signal transmitted by the encoder assembly. The difference between the transmitted and the received signals is determined by, for example, roll-off, reflections due to impedance mismatches, and impinging aggressor signals.

A reconstructed payload signal 502 longer than a single distributing interval 102 is encoded over the course of several distributing intervals and thus over the course of several decoding intervals 14 and correspondingly several transport intervals 2. In a preferred embodiment, the parameters defining the decoder assembly 328, including transport interval, decoding interval, distributing interval, N 8, L 10, code book 356, and permuter 348 permutation all remain constant throughout the steps involved in processing of one set of reconstructed payload samples 357 corresponding to a single set of output vector 352 contents. In one embodiment of the decoder assembly, all of the decoding parameters are "hard coded" and cannot be changed. Because the decoding of one output vector is logically independent from the decodings of all previous and of all following output vectors, there is no reason that the decoding parameters cannot change from one output vector's worth of reconstructed payload samples to the next. Therefore, in another embodiment of the decoder assembly, any of the decoding parameters may be varied from one distributing interval to the next under algorithmic control, for example in response to changes in payload characteristics, EM pathway 314 characteristics, and/or application requirements.

In another embodiment of an analog version of the decoder assembly 328, the analog portion can be implemented as a switched capacitor circuit. Given that the operation of this circuit will entail the use of sample and hold circuits, multiplier circuits and a pipeline type operation, it should be obvious to those skilled in the art the similarities to state-of-the-art ADC design. Indeed, one such implementation of the analog decoder assembly allows for accommodating any amplitude representation, from binary through n-ary to continuous, through the simple selection of thresholding levels in the pipeline operation of the decoder assembly. In an embodiment, a decoder assembly is design parametrically reconfigurable to accommodate either digital signals or pulsatile signals, thereby enabling system flexibility.

FIG. 10 shows the architecture of an embodiment of one synchronization acquisition and tracking circuit, which can be described as a sliding correlator. The key input is the received signal 214, and the key output is the clock signal 826. The circuit in FIG. 10 comprises a PN generator 814, clocked by a phase-locked loop (PLL) 810, which is adjusted finely by the correlation peak detector 320. The PN generator is designed so as to have a narrow band of frequency diversity, i.e. it natively will run at close to the target frequency and has a band of control around that center frequency. The output 824 from the sliding correlator is analyzed in the correlation peak detector to determine whether or not a lock condition has been achieved or if the frequency is either too high or too low. This lock detector then adjusts the PLL frequency to servo on synchronization.

The sliding correlator shown in FIG. 10 can be implemented as either a sampled and digitized representation of the incoming signal in which case the correlation is formed in digital logic. Another implementation of the sliding correlator can be as switched analog circuitry, in which in this case the incoming signal is sampled and the correlation is performed in switched capacitor circuitry. One embodiment simply adjusts the phase by changing the frequency and accomplishing both the coarse and the fine adjustments by adjusting the PLL frequency.

In an alternative embodiment, the encoder assembly 326 sends a training sequence with known characteristics as a preamble to a series of vector transmissions, so as to facilitate synchronization acquisition and tracking. This training sequence may occur at the beginning of every vector transmission, or it may be transmitted as an independent snippet along with the input payload snippets. Sending the training sequence as an independent payload signal allows this probe signal to characterise the quality of transmission media. Such characterization data is used for various signal correction parameters like pre-emphasis. Additionally, the training sequence signal could also be of much longer period than one collecting interval, increasing resilient against noise and interference. In the present disclosure, the training sequence is particularly powerful in facilitating acquisition and tracking simply because the training sequence can be made to have a constant amplitude.

An example of a parallel-correlation synchronization acquisition and tracking system is shown in FIG. 11. This system analyses adjacent taps 902, 904, and 906 in the PN sequence generator 814. By evaluating three adjacent taps concurrently, as well as the correlation relating to each of those individual taps, in the correlation spike detector 320, the lock detection algorithm is greatly simplified.

In a further embodiment, the receiving circuit is adapted to retransmit a phase-aligned and synchronized signal back to the transmitting circuit in an independent sub-band. Completing the control loop in this manner allows the transmitter to transition, an embodiment, between providing the probe signal versus encoding payload snippets. Upon initial power-up, the transmitting circuit transmits the probe signal until it acquires a sub-band signal that is returned from the receiving circuit. When the returned signal is received, the transmitting circuit then starts transmitting data according to the received parameters. This closed-loop control system allows a robust and self-calibrating LST to be implemented.

FIG. 12 shows a straightforward round-robin permutation of the permuter 348, wherein a next sample 302 from each successive index in the decoder output vector 352 is distributed in turn to the next sample 804 in the next signal 502 in the set of reconstructed payload snippets $\alpha'$, $\beta'$, ..., $\omega'$, until all N output vector locations have been exhausted. There are potentially different numbers of samples per reconstructed payload snippet, all distributed during the one distributing interval. The numbered circles indicate the order in which the decoder output vector contents are distributed to reconstructed payload snippets during the distributing interval. Exactly N samples are distributed during the distributing interval.

Although there are N! equally good choices for permuter 348 permutation, successful payload transport demands that the decoder 512 permutation implement the inverse of the encoder 510 permutation 510 (shown in other figures). Ensuring agreement regarding such details is appropriately the subject of international standards, rather than of the present disclosure.

The schema drawn in FIG. 12 applies to many possible types of signal. For example, there could be a single payload signal, consisting of a representation of video wherein each successive sample is a color value (for example, 3 (R/G/B) per pixel). Another example is also a single payload signal, this one consisting of color values from several independent video signals are interleaved. Further examples include diverse types of signal, for example, video, audio, chemical, mechanical/haptic, and so forth. An embodiment of one such hybrid example includes different numbers of samples from/to each payload signal during each transport time interval. Further examples include each of the four types of signal (digital, analog, pulsatile, and neural) solo or in combination.

FIG. 13 illustrates round-robin assignment of samples from indices in an 8-element decoder output vector to a parallel-RGB output video signal arising from reception of a first transport interval.

FIG. 13 illustrates an especially common special case of the general schema described in FIG. 12. In this example, the reconstructed payload consists of 3 signals 502, representing the R, G, and B color planes, respectively, of a single reconstructed RGB-based video signal. N, the number of elements in the decoder 512 output vector 352, happens to be 8. This example shows the round-robin assignment during a given distributing interval.

Further to the example begun in FIG. 13, FIG. 14 illustrates round-robin assignment during the immediately following distributing interval.

FIG. 15 shows the structure of a binary code book which is a subset of the identity matrix, for the case where L=N+3. The chip index j 916 runs from 0 to L−1 horizontally across the figure, and the input/output vector index i 914 runs from 0 to N−1 vertically down the figure.

FIG. 16 shows an example of a 127×127 binary code book whose codes is each a unique rotation of a common PN sequence. In the figure, a black square corresponds to a "1" value, while a white square corresponds to a "−1" value. The matrix for pulsatile modulation is constructed per the following steps:

1. Instantiate the L×L identity matrix
2. Keep only the $1^{st}$ N rows
3. Convert 0 entries to −1 values
4. The result is the example code book depicted in FIG. 16

FIG. 17 shows an example of a 128×128 binary code book, which is a Walsh-Hadamard matrix. In the figure, a black square corresponds to a "1" value, while a white square corresponds to a "−1" value.

FIG. 18 shows an example of a 128×128 binary code book, which is constructed by convolving a Walsh-Hadamard matrix with a near-PN sequence. In the figure, a black square corresponds to a "1" value, while a white square corresponds to a "−1" value.

In an embodiment, the payload signals 500 and 502 comprise video signals, for example as illustrated in FIG. 5, FIG. 6, FIG. 13, and FIG. 14 for the case of fully populated R/G/B color planes. FIG. 19 shows one embodiment wherein the subject of this disclosure is applied to (a class of) video systems. The architecture depicted in FIG. 19 comprises a predetermined number C of cameras 516 and another predetermined number D of displays 518. The architecture depicted in FIG. 19 also includes a media processing unit (MPU) 548. The MPU in turn contains a video processor 536, non-volatile storage 560, with which the video processor exchanges storage signals 562, and a Wide Area Network interface 544, through which the video processor communicates with the Internet 576 via Internet Protocol signals 546.

The camera 516 depicted in FIG. 19 comprises a lens 520, which refracts incident light 528 to project focused light 534 onto a focal plane 554 occupied by an image sensor 522. The image sensor produces an output signal 524 which comprises an ordered series of light measurements, each measurement corresponding to a geometric location within the focal plane, wherein each measurement is acquired during a predetermined image sensor exposure interval 4. In one pipeline-balanced embodiment, the image sensor exposure interval equals the transport interval 2. The camera also includes an encoder assembly 326. 538 is a circuit that adapts image sensor output samples as an input payload signal for the encoder.

The image sensor 522 output signal 524 is intrinsically pulsatile; converting to digital signals uses an additional analog-to-digital converter circuit, which cannot possibly add fidelity while certainly adding non-zero manufacturing cost. A simplest embodiment of the subject of this disclosure conveys pulsatile signals directly, without requiring analog-to-digital conversion of the light measurements, resulting in fit-for-purpose transmission of high-resolution video signals at least cost compared to prior arrangements.

The display 518 shown in FIG. 19 comprises a decoder assembly 328, a circuit 540 that adapts the decoder assembly output (reconstructed display control signal snippets) to the input 526 of display element array controller 556. The array controller generates a series of brightness control values 558. Each brightness control value determines the brightness maintained during each predetermined display array refresh interval 6 of the light-emitting element at each geometric location within the array 530 of display elements. In one pipeline-balanced embodiment, the display array refresh interval equals the transport interval 2. The display array consists of elements, such as certain kinds of diodes, which emit light 552. Viewers' brains interpret such activity over time as moving images.

In a video embodiment of FIG. 19, the centrepiece of the video system depicted in is the central processing unit (MPU) 548, which in turn is based on a video processor 536. The MPU receives a signal from every camera 516 via LST 1, and the MPU transmits a signal to every display 518 in the system via LST 1. All of the camera signals and all of the display signals each is independent from all other video signals in the system. A potentially trivial circuit 568 adapts each decoder assembly output 564 (reconstructed camera output signal snippets) to the data format 570 required for the video processor. Similarly, a potentially trivial circuit 574 adapts prepared display input signals 572 from the data format of the video processor to an input payload signal 566 destined for the corresponding display. Circuits 568 and 574 are well known in the art.

In an embodiment, the MPU 548 performs a variety of operations on video, including decoding stored content 562 retrieved from non-volatile memory 560, storing compressed video signals 562 to non-volatile memory, and/or exchanging Internet Protocol signals 546 with the Internet 576 via a WAN Modem 544. A bidirectional converter 542 translates between Ethernet packets and the pulsatile or digital signals occupying the datapaths of the video processor.

In one embodiment, the video processor 536 is a CPU. In another embodiment, the video processor is a GPU. The video processor may be implemented either with digital datapaths or with pulsatile datapaths. Digital datapaths demand A/D on inputs and D/A on outputs and are therefore intrinsically less efficient for video than pulsatile datapaths.

A broad diversity of common video systems are seen to be parametric variants of the schema sketched in FIG. 19, for example:

In one embodiment of a home entertainment system circa 1990: C=0—there are no cameras. D=1—a CRT display is encased in a box that sits on a table. The MPU 548 is a tuner/amplifier circuit assembly, the EM pathway 314 is coaxial cable, and the LST 1 is PAL.

In one embodiment of a home entertainment system circa 2016, C=2—a Kinect system includes stereo monochrome computer vision. D=1—an HDMI display hangs on the wall. The MPU 548 is a gaming machine such as, for example, a PlayStation™ of Sony or Xbox™ of Microsoft, the EM pathway 314 is HDMI cable, and the LST 1 is HDMI.

In one possible embodiment of a home entertainment system, for example one implementing iVR™ ("immersive virtual reality"), C=256—high-resolution cameras provide 3D 360-degree machine vision inputs, making a whole new range of inputs available for gesture- and movement-based interfaces. D=2048—every solid wall, ceiling, and floor is constructed from flexible, rugged display panels. The MPU 548 is a computationally enhanced variant of a PlayStation or Xbox. The EM pathway 314 is any American Wire Gauge (AWG) wire pair, and the LST 1 is the subject of the present disclosure. This embodiment enables an experience that is qualitatively different from what is heretofore expected of pixel-rich Internet content.

In one embodiment of a passenger vehicle system, C=8—a variety of infrared (IR) and ultraviolet (UV)

and visible light sensors collects data for machine vision analysis for safety. D=4—displays are provided on the dash and in front seat head rests, for rear passenger entertainment. The MPU 548 is the engine control unit (ECU). The EM pathway 314 is CAT-3, and the LST 1 is LVDS.

In one possible embodiment of a passenger vehicle system, C=32—a variety of IR and UV and visible light sensors collects data for machine vision analysis for safety, and video-intensive Internet interaction is enabled for passengers. D=64—displays are provided on all solid surfaces and on exterior glass and on the dash, both for control and for passenger entertainment. The MPU 548 is the engine control unit (ECU). The EM pathway 314 is inexpensive cable, and the LST 1 is the subject of the present disclosure. This embodiment enables passengers to enjoy iVR entertainment experiences, while the driver can take advantage of the most responsive possible heads-up display for controlling the vehicle.

In one embodiment of a retail signage video system (e.g., fast food restaurant menus), the MPU 548 is a tower PC or server. The EM pathway 314 is CAT-5/6, and the LST 1 is HDBaseT.

In one possible embodiment of a retail signage video system, the MPU 548 is a tower PC or server. The EM pathway 314 is any AWG wire pair, and the LST 1 is the subject of the present disclosure. This embodiment allows displays 518 to be placed further away from the MPU, thus saving costs by allowing a single MPU to accommodate a larger number of displays. Moreover, the cables are far less expensive, and it is easy to terminate such cables in the field (currently a major barrier to HDMI enabling iVR).

In one embodiment of an HD video surveillance system, the MPU 548 is a DVR. The EM pathway 314 is coaxial cable, and the LST 1 is Analog HD.

In one possible embodiment of an 8K video surveillance system, the MPU 548 is a DVR. The EM pathway 314 is any AWG wire pair, and the LST 1 is the subject of the present disclosure. This embodiment carries high-resolution video cost-effectively over legacy infrastructure cabling.

Other embodiments that can be shown to be parametric instantiations of the schema of FIG. 19 include a circa 1970 cinema system wherein C=0 and D=1, an example surround-view system wherein C=0 and D=8, a futuristic iVR cinema system wherein C=64 and D=64, an HD rock concert video system wherein C=8 and D=8, and an 8K rock concert video system, wherein C=128 and D=128, that enables high-resolution live experiences incorporating video feeds of performers, audience members, prepared video signals, and synthetically generated video signals.

The subject of the present disclosure is aspects of an LST 1 that transfers any type of sampled signal 500 along an EM pathway 314. In many applications requiring transport of video, audio, and other kinds of data signals, it is desirable also to be able to transport information along the EM pathway in the direction opposite to that of the main payload information flow. For example, the MPU 548 shown in FIG. 19 may benefit from the ability to send control and configuration information to sensors, including cameras and microphones. The disclosed LST does not preclude low-bandwidth upstream communication.

The encoder assembly 326 encodes a vector of N samples every encoding interval. If we call the number of encoding intervals per second f (so f=1/encoding interval), the throughput of the encoder assembly is Nf samples per second, making available Lf samples per second for transmission into the EM pathway 314, where L>=N. For example, 1920×1080 1080p60 HD Video, is approximately 2 million pixels or 6 million samples per frame, or 360 million samples per second for an RGB encoding of each pixel. That tells us Nf=360e6=0.36e9. It might reasonably be expected that Lf=1 GHz=1e9. Then N/L=0.36, or for L=128, N=46. The encoder assembly transmits the entire ordered series of output values during the transport interval 1.

FIG. 20 shows an example oscilloscope trace of a signal arriving from the EM pathway 314 at the decoder assembly 328 input terminal 340. The vertical scale is voltage, and the horizontal scale is 100 ps oscilloscope measurement interval. In FIG. 20, 20 oscilloscope measurement intervals correspond to one chip interval $\tau$.

Throughout the specification and the claims that follow, unless the context requires otherwise, the words "comprise" and "include" and variations such as "comprising" and "including" will be understood to imply the inclusion of a stated integer or group of integers, but not the exclusion of any other integer or group of integers.

The reference to any prior art in this specification is not, and should not be taken as, an acknowledgement of any form of suggestion that such prior art forms part of the common general knowledge.

It will be appreciated by those skilled in the art that the invention is not restricted in its use to the particular application described. In particular, while some of the examples shown are for RGB full-color images, the subject of this disclosure applies regardless of the depth/number of payload signals or color space of any video in the payload, including all variants of chroma/luma separated (and chroma-sub-sampled) color spaces (e.g., YUV, YUV 4:2:0, etc.), as well as Monochrome (i.e., just Y). Neither is the present invention restricted in its preferred embodiment with regard to the particular elements and/or features described or depicted herein. It will be appreciated that the invention is not limited to the embodiment or embodiments disclosed, but is capable of numerous rearrangements, modifications and substitutions without departing from the scope of the invention as set forth and defined by the following claims.

We claim:

1. A method of transmitting an input payload of one or more sampled video signals over an electromagnetic pathway, said method comprising:

collecting an indexed input vector of N samples from said one or more sampled video signals using a predetermined permutation;

encoding said N samples of said indexed input vector with reference to a predetermined code set of N mutually-orthogonal codes each of length L into an ordered series of L output values, each of said N codes being associated with one of said samples, wherein L>=N>=2; and making available said encoded ordered series of L output values to said electromagnetic pathway as an ordered series of L analog output values.

2. The method as recited in claim 1 wherein said sampled video signals include analog samples, and wherein said encoded ordered series of L output values are analog output values.

3. The method as recited in claim 1 wherein said sampled video signals include digital samples, said method further comprising:

converting said encoded ordered series of L output values into said ordered series of L analog output values.

4. The method as recited in claim 1 wherein said one or more sampled video signals originate at a single video equipment source and wherein said electromagnetic pathway terminates at a single video equipment sink.

5. The method as recited in claim 1 further comprising: continuously repeating said steps of collecting, encoding and making available for successive N samples from said one or more sampled video signals.

6. The method as recited in claim 1 further comprising: synchronously encoding said N samples into said ordered series of L output values, wherein said N samples are represented by said L output values.

7. The method as recited in claim 1 further comprising: transmitting said ordered series of L analog output values over said electromagnetic pathway to a single video equipment sink.

8. The method as recited in claim 1 wherein each of said N codes is indexed, said method further comprising:
encoding said N samples by repeating, for each of L indices in the codes, the sub-steps of
a) modulating each sample in the indexed input vector by the value at said each L index in said code associated with said one of said N samples, and
b) summing the results of all modulations of step a) to form one of said ordered series of L output values.

9. A method of receiving an ordered series a L analog input values from an electromagnetic pathway, said method comprising:
receiving said ordered series of L analog input values from said electromagnetic pathway at a receiver;
decoding said L analog input values with reference to a predetermined code set of N mutually-orthogonal codes each of length L into an output vector of N samples, each of said N codes being associated with one of said samples, wherein said predetermined code set is the same as a code set used to encode said ordered series of L input values, and wherein $L>=N>=2$; and
distributing said N samples from said output vector to one or more reconstructed sampled video signals using a predetermined permutation which is the inverse of a permutation used in a transmitter corresponding to said receiver.

10. The method as recited in claim 9 wherein said L input values for decoding are analog input values, said method further comprising:
decoding said L analog input values to produce said output vector of N samples, said N samples being analog values.

11. The method as recited in claim 9 said method further comprising:
converting said L analog input values into L digital input values; and
decoding said L digital input values to produce said output vector of N samples, said N samples being digital values.

12. The method as recited in claim 9 wherein one or more sampled video signals corresponding to said one or more reconstructed sampled video signals originate at a single video equipment source and wherein said one or more reconstructed sampled video signals are delivered to a single video equipment sink.

13. The method as recited in claim 9 further comprising:
continuously repeating said steps of receiving, decoding and distributing for successive ordered series of L analog input values.

14. The method as recited in claim 9 further comprising:
synchronously decoding said L input values into said output vector of N samples, wherein said N samples represent said L input values.

15. The method as recited in claim 9 wherein said receiver is located at a single video equipment sink.

16. The method as recited in claim 9 wherein each of said N codes is indexed, said method further comprising:
decoding said L input values by repeating, for each of L indices, the sub-step of repeating, for each of N indices in said output vector the sub-steps of
a) correlating the value indexed by the L index in the L input values by a commonly indexed value in the code associated with the output vector index,
b) summing the correlation result from sub-step a) with contents of the correspondingly indexed output vector location, to produce a summing result, and
c) storing the summing result from sub-step b) in the output vector at the corresponding index.

17. An apparatus for transmitting an input payload of one or more sampled video signals over an electromagnetic pathway, said apparatus comprising:
a permuter that assigns samples from said input payload to locations in an indexed input vector of N locations using a pre-determined permutation, each location in said indexed input vector receiving one of said samples;
an encoder that encodes said N samples of said indexed input vector with reference to a predetermined code set of N mutually-orthogonal codes each of length L into an ordered series of L output values, each of said N codes being associated with one of said samples, wherein $L>=N>=2$; and
an output terminal that makes available said encoded ordered series of L output values to said electromagnetic pathway as an ordered series of L analog output values.

18. The apparatus as recited in claim 17 wherein said sampled video signals include analog samples, and wherein said encoded ordered series of L output values are analog output values.

19. The apparatus as recited in claim 17 wherein said sampled video signals include digital samples, said apparatus further comprising:
a digital-to-analog converter that converts said encoded ordered series of L output values into said ordered series of L analog output values.

20. The apparatus as recited in claim 17 wherein said one or more sampled video signals originate at a single video equipment source and wherein said electromagnetic pathway terminates at a single video equipment sink.

21. The apparatus as recited in claim 17 wherein said permuter continuously assigns samples from said input payload to locations in said indexed input vector, wherein said encoder continuously encodes N samples of said input vector using said code set, and wherein said output terminal continuously makes available said encoded ordered series of L output values to said electromagnetic pathway as an ordered series of L analog output values.

22. The apparatus as recited in claim 17 wherein said encoder synchronously encodes said N samples into said ordered series of L output values, wherein said N samples are represented by said L output values.

23. The apparatus as recited in claim 17 wherein said output terminal transmits said ordered series of L analog output values over said electromagnetic pathway to a single video equipment sink.

24. The apparatus as recited in claim 17 wherein each of said N codes is indexed, said apparatus further comprising:
- N two-input modulators, each two-input modulator corresponding to each location of said input vector, for each of the L indices in the codes, each modulator being arranged to modulate its corresponding sample in the input vector by the value at said each L index in said code associated with said one of said corresponding samples; and
- an N-input summer for summing the outputs of said modulators, said summer summing the results of said modulations for each of the L indices in the codes to form one of said ordered series of L output values.

25. An apparatus for receiving an ordered series of L analog input values from an electromagnetic pathway, said apparatus comprising:
- a receiver terminal for receiving said ordered series of L analog input values from said electromagnetic pathway at a receiver;
- a decoder that decodes said L analog input values with reference to a predetermined code set of N mutually-orthogonal codes each of length L into an output vector of N samples, each of said N codes being associated with one of said samples, wherein said predetermined code set is the same as a code set used to encode said ordered series of L input values, and wherein L>=N>=2; and
- a permuter that distributes said N samples from said output vector to one or more reconstructed sampled video signals using a predetermined permutation which is the inverse of a permutation used in a transmitter corresponding to said receiver.

26. The apparatus as recited in claim 25 wherein said L input values for decoding are analog input values, and wherein said decoder decodes said L analog input values to produce said output vector of N samples, said N samples being analog values.

27. The apparatus as recited in claim 25 said apparatus further comprising:
- an analog-to-digital converter that converts said L analog input values into L digital input values, wherein said decoder decodes said L digital input values to produce said output vector of N samples, said N samples being digital values.

28. The apparatus as recited in claim 25 wherein one or more sampled video signals corresponding to said one or more reconstructed sampled video signals originate at a single video equipment source and wherein said one or more reconstructed sampled video signals are delivered to a single video equipment sink.

29. The apparatus as recited in claim 25 wherein said receiver terminal continuously receives an ordered series of L analog input values, wherein said decoder continuously decodes input values using said predetermined code set, and wherein said permuter continuously distributes N samples from said output vector to one or more reconstructed sampled video signals.

30. The apparatus as recited in claim 25 wherein said decoder synchronously decodes said L input values into said output vector of N samples, wherein said N samples represent said L input values.

31. The apparatus as recited in claim 25 wherein said receiver is located at a single video equipment sink.

32. The apparatus as recited in claim 25 wherein each of said N codes is indexed, said apparatus further comprising:
- a set of N two-input correlators, each correlator associated with one of N locations of said output vector, each correlator having as one input a value in the ordered series of L input values and as the other input a corresponding value in the code associated with said one of N locations; and
- a set of N two-input summing circuits, each summing circuit associated with said one of N locations, each two-input summing circuit having as one input the output of the corresponding two-input correlator and as the other input contents of the corresponding output vector location.

* * * * *